United States Patent
Kawarai et al.

(10) Patent No.: US 8,027,262 B2
(45) Date of Patent: Sep. 27, 2011

(54) METHOD AND APPARATUS FOR KEEPING TRACK OF VIRTUAL LAN TOPOLOGY IN NETWORK OF NODES

(75) Inventors: Kenichi Kawarai, Kawasaki (JP); Hiroyuki Kaneko, Kawasaki (JP); Kazuyuki Tajima, Kawasaki (JP); Kou Takatori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1064 days.

(21) Appl. No.: 11/050,152

(22) Filed: Feb. 3, 2005

(65) Prior Publication Data

US 2005/0265356 A1 Dec. 1, 2005

(30) Foreign Application Priority Data

May 14, 2004 (JP) ................. 2004-144326

(51) Int. Cl.
*H04J 3/14* (2006.01)
(52) U.S. Cl. .................. 370/241; 370/254
(58) Field of Classification Search ............ 370/395.53, 370/397, 399, 400, 409, 411, 254, 255, 390, 370/392, 401, 432, 497, 518; 709/224
See application file for complete search history.

(56) References Cited

U.S. PATENT DOCUMENTS

| | | | | |
|---|---|---|---|---|
| 5,884,036 A * | 3/1999 | Haley | | 709/224 |
| 6,130,889 A * | 10/2000 | Feldman et al. | | 370/397 |
| 6,789,090 B1 | 9/2004 | Miyake et al. | | |
| 6,950,431 B1 * | 9/2005 | Nozaki et al. | | 370/390 |
| 7,079,537 B1 * | 7/2006 | Kanuri et al. | | 370/392 |
| 7,289,538 B1 * | 10/2007 | Paradise et al. | | 370/497 |
| 7,324,513 B2 * | 1/2008 | Shankar et al. | | 370/390 |
| 2002/0001310 A1 * | 1/2002 | Mai et al. | | 370/390 |
| 2003/0095554 A1 * | 5/2003 | Shimizu | | 370/395.53 |
| 2004/0017816 A1 * | 1/2004 | Ishwar et al. | | 370/395.53 |
| 2004/0022224 A1 * | 2/2004 | Billhartz | | 370/338 |

(Continued)

FOREIGN PATENT DOCUMENTS

JP 5-207017 8/1993

(Continued)

OTHER PUBLICATIONS

"Japanese Office Action", Partial English-language translation, mailed Jun. 2, 2009 from JP Patent Office for corresponding JP App. No. 2004-144326.

(Continued)

*Primary Examiner* — Kevin C Harper
*Assistant Examiner* — Leon Andrews
(74) *Attorney, Agent, or Firm* — Fujitsu Patent Center

(57) ABSTRACT

An arbitrary node that belongs to a virtual LAN sends a request packet including a count value indicating the number of communication hops across nodes to each of its adjacent nodes that belong to the virtual LAN and are adjacent. Upon receiving the request packet, each of the adjacent nodes sends the request packet in which the count value is incremented or decremented to each of its adjacent nodes that belong to the virtual LAN and are adjacent to the node, excluding a sender of the request packet received, and sends a reply packet including the sender's address, an address of the node that is a replying node, and the count value to a given return destination. The return destination collects reply packets sent thereto and keeps track of the topology of the nodes constituting the virtual LAN from information contained in the reply packets.

11 Claims, 21 Drawing Sheets

U.S. PATENT DOCUMENTS

2004/0032868 A1* 2/2004 Oda et al. .................. 370/389
2004/0125803 A1* 7/2004 Sangroniz et al. ............ 370/390

FOREIGN PATENT DOCUMENTS

| | | |
|---|---|---|
| JP | 6-244852 | 9/1994 |
| JP | 7-235924 | 9/1995 |
| JP | 11-340980 A | 12/1999 |
| JP | 2001-197076 A | 7/2001 |

OTHER PUBLICATIONS

Wada, Makoto et al.,"A study on flooding control method based on biotech growth", IEICE Technical report NS2003-220. vol. 103 No. 506, pp. 59-62, *The Institute of Electronics, Information, and Communication Engineers*, Dec. 12, 2003.

* cited by examiner

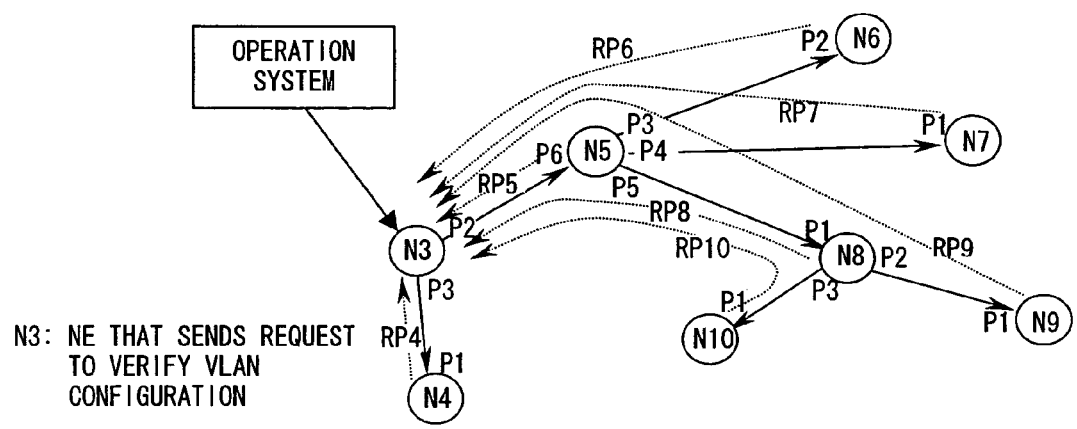
F I G. 2 A

ADJACENT NODES TABLE FOR COMPANY B

| REPLY PACKETS THAT THE REQUESTING NE(N3) RECEIVES | HOP COUNT | SENDING NODE ID | SENDING PORT NO. | RECEIVING NODE ID | RECEIVING PORT NO. |
|---|---|---|---|---|---|
| RP4 → | 1 | N3 | P3 | N4 | P1 |
| RP5 → | 1 | N3 | P2 | N5 | P6 |
| RP6 → | 2 | N5 | P3 | N6 | P2 |
| RP7 → | 2 | N5 | P4 | N7 | P1 |
| RP8 → | 2 | N5 | P5 | N8 | P1 |
| RP9 → | 3 | N8 | P2 | N9 | P1 |
| RP10 → | 3 | N8 | P3 | N10 | 1P |

F I G. 2 B

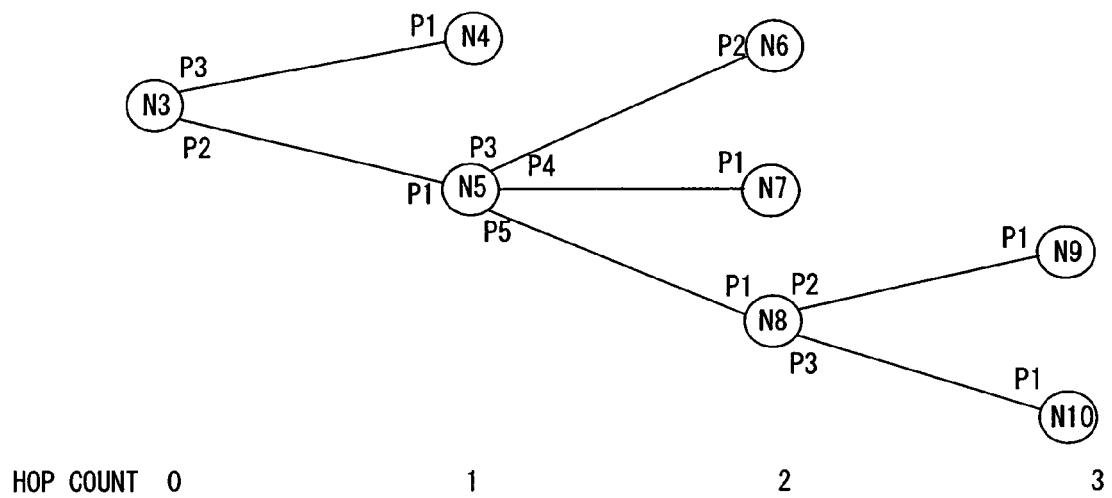
F I G. 2 C

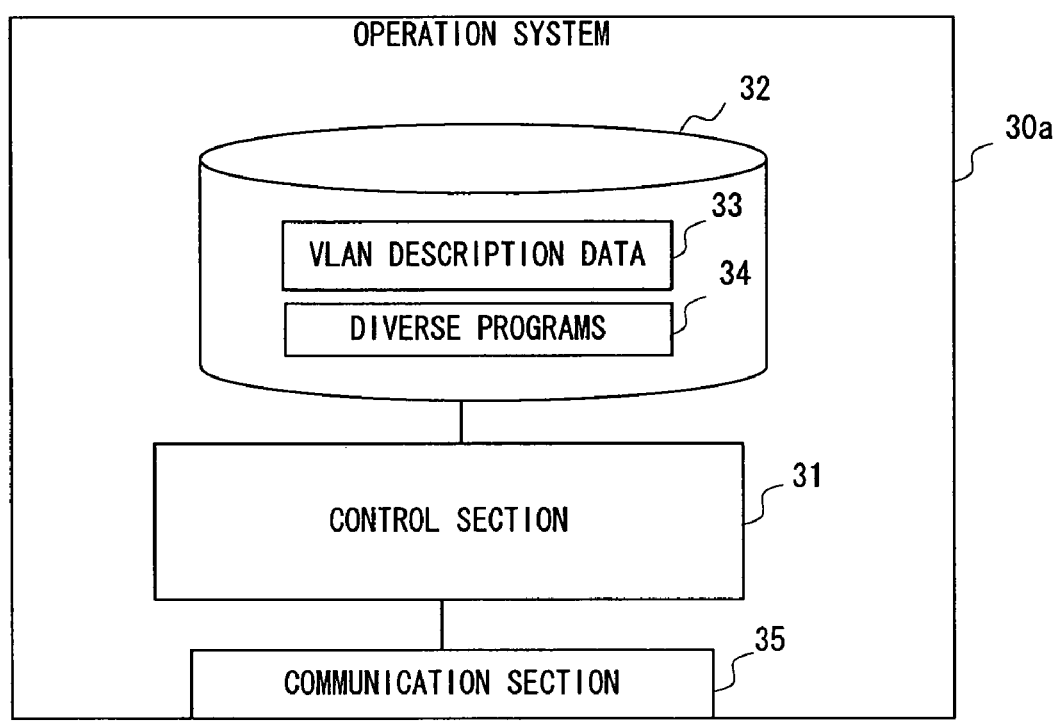
F I G. 3

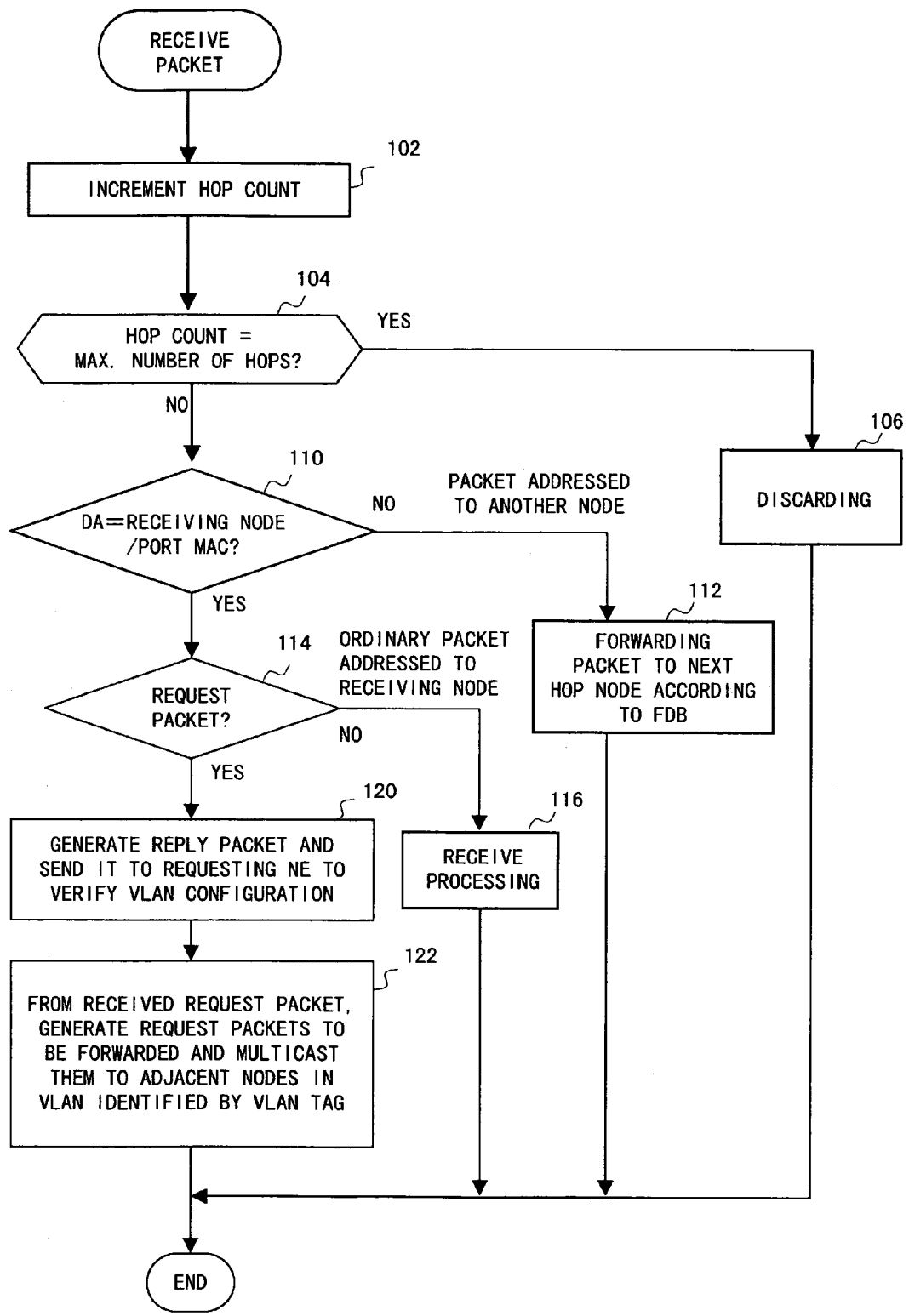
F I G. 7

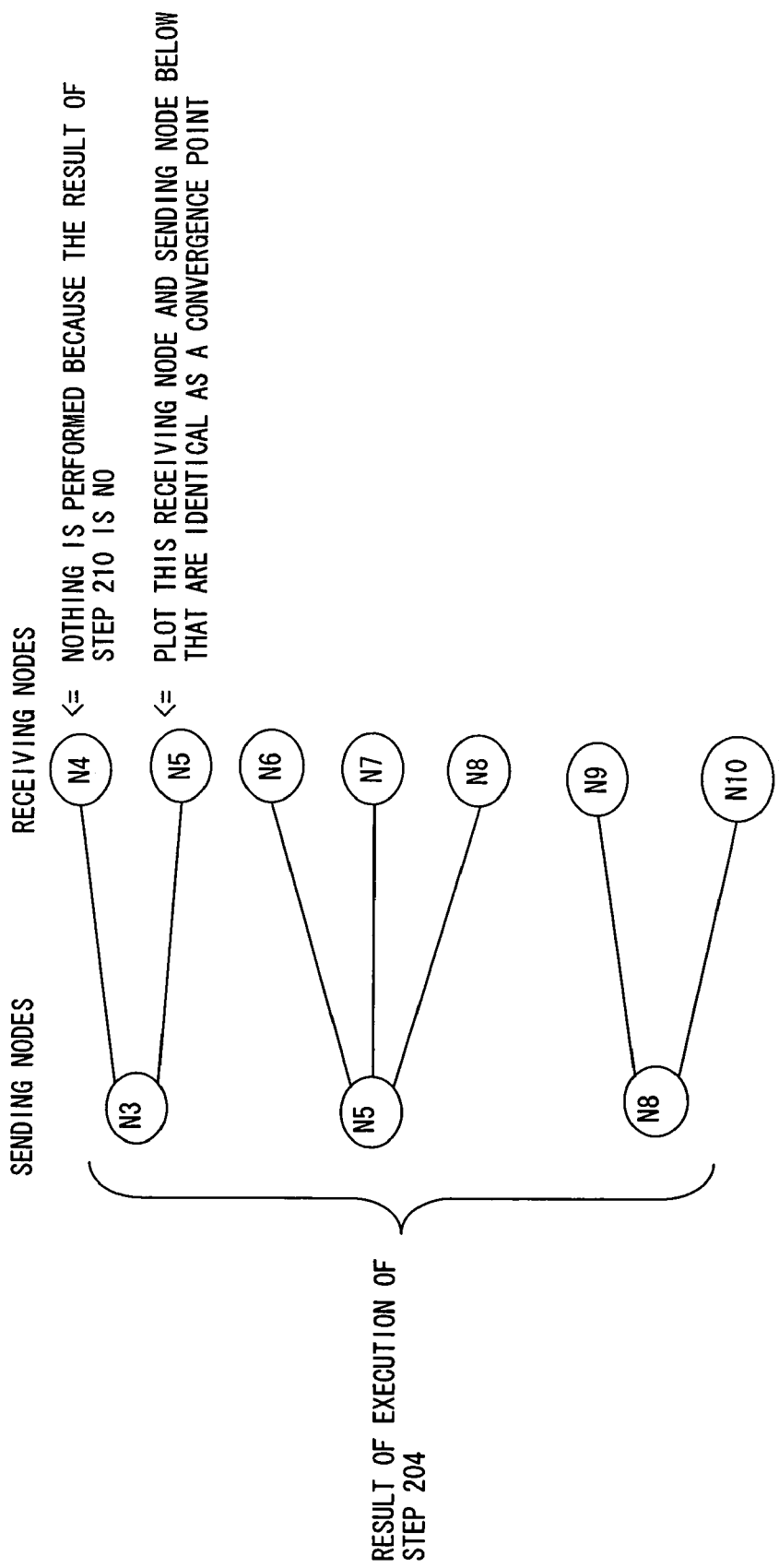

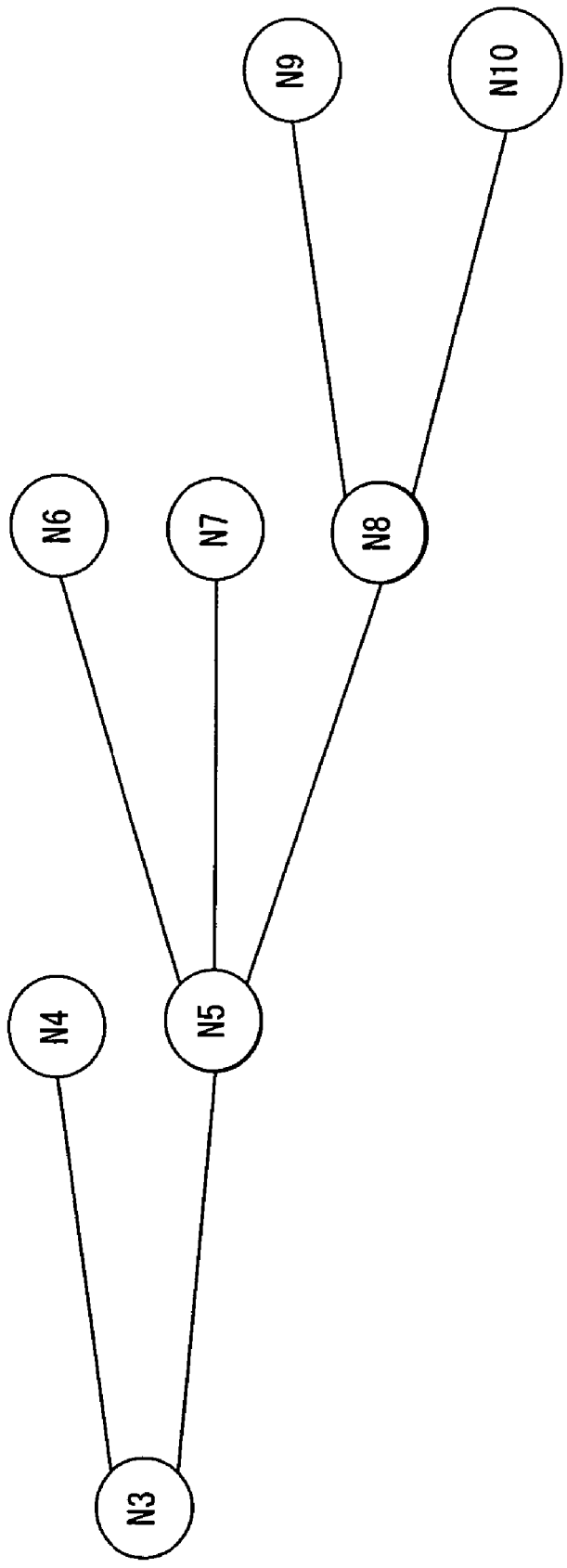

| REPLY PACKETS THAT THE REQUESTING NE(N3) RECEIVES | HOP COUNT | RECEIVING NODE ID | RECEIVING PORT NO. | SENDING NODE ID | SENDING PORT NO. |
|---|---|---|---|---|---|
| RP4 → | 1 | N4 | P1 | N3 | P3 |
| RP5 → | 1 | N5 | P6 | N3 | P2 |
| RP6 → | 2 | N6 | P2 | N5 | P3 |
| RP7 → | 2 | N7 | P1 | N5 | P4 |
| RP8 → | 2 | N8 | P1 | N5 | P5 |
| RP9 → | 3 | N9 | P1 | N8 | P2 |
| RP10 → | 3 | N10 | P1 | N8 | P3 |

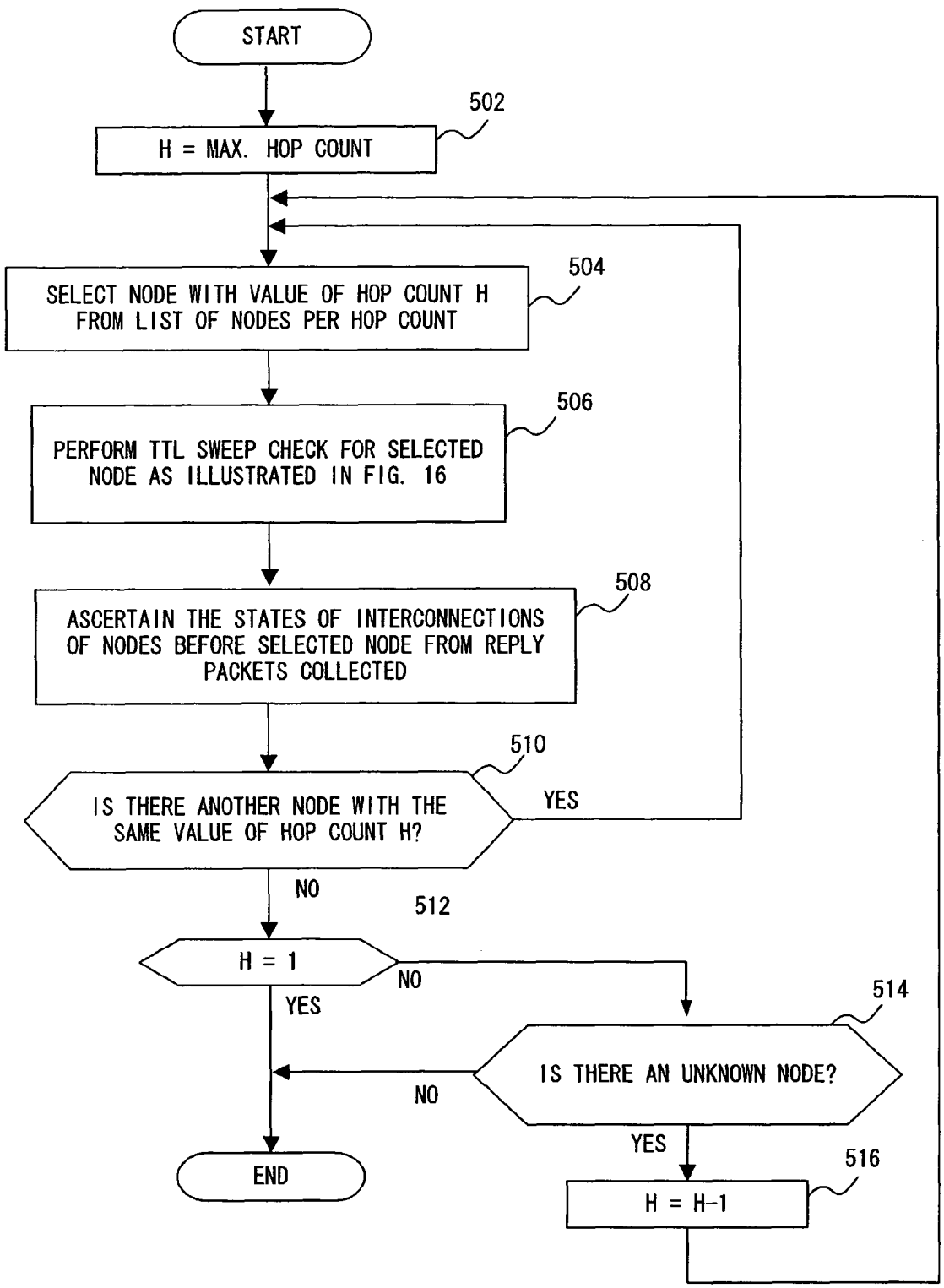
F I G. 17

METHOD AND APPARATUS FOR KEEPING TRACK OF VIRTUAL LAN TOPOLOGY IN NETWORK OF NODES

BACKGROUND OF THE INVENTION

1. Field of the Invention

The present invention relates to an Ethernet network or the like and, more particularly, to a technique for keeping track of virtual LAN topology set up on the Ethernet network.

2. Description of the Related Art

When telecommunications carriers and the like (type one telecommunications carriers which are generally termed carriers) that possess their own infrastructures required to provide services provide communications services, it is general practice to organize and operate multiple so-called virtual local area networks (LANs) in which nodes constituting their own Ethernet networks are logically grouped and allocated to companies which are their customers, using a virtual LAN technology (for example, IEEE 802.1Q). This kind of service is generally called a wide area LAN service or wide area L2 (layer 2) service.

FIG. 1 is a diagram showing an example of communications network infrastructure that a carrier possesses. In FIG. 1, the communications network 1 owned by the carrier is made up of nodes 10 denoted by small circles, links 12, each of which enables node-to-node communication, and an operation system 30 which administrates the entire communications network consisting of the nodes 10 and links 12. Combination of N and a number indicates a node ID and combination of P and a number indicates a port ID that is used for one node to communication with another node. For example, nodes N1 and N2 communicate through a port P1 of the node N1 and a port P2 of the node N2.

In the example of FIG. 1, the carrier logically sets up a virtual LAN 20-A with nodes N1 to N4 for company A and a virtual LAN 20-B with nodes N3 to N10 for company B.

Now, there will occur no problem as long as all configurations (settings) of these virtual LANs are performed by the operation system 30, but reconfigurations are sometimes performed by a person in charge at a node 10 not the operation system 30. In such an event, the operation system 30 may lose track of exact states of connections on the virtual LANs, as the virtual LANs management data supervised by the operation system 30 does not agree with actual configurations of nodes constituting the virtual LANs.

As prior art, ping and traceroute that are TCP/IP related utilities provide means for knowing node-to-node connectivity and nodes interconnections on the IP level. By applying techniques equivalent to the above utilities to the Ethernet level, it is possible to recognize bridge-to-bridge connectivity and bridge-to-bridge connections. However, to use these techniques, it is necessary to know the address (IP address or MAC address) of a target node. Therefore, these techniques are not useful in conditions where reconfiguration occurs with a node that is not exactly identifiable among the nodes constituting a virtual LAN like the above event. The IP address is an Internet Protocol address and the MAC address is a Media Access Control address.

SUMMARY OF THE INVENTION

The present invention aims to provide a technique for keeping track of the actual states of nodes interconnections on a virtual LAN in an Ethernet network or the like.

In a network where a virtual LAN (local area network) is set up, the present invention provides a method for detecting topology of nodes constituting the virtual LAN. In a first aspect of the present invention, a method for detecting virtual LAN topology comprises a step in which an arbitrary node that indisputably belongs to the virtual LAN sends a request packet including a count value indicating the number of communication hops across nodes to each of its adjacent nodes that belong to the virtual LAN and are adjacent, a step in which, upon receiving the request packet, each of the nodes sends the request packet in which the count value is incremented or decremented, as predetermined, to each of its adjacent nodes that belong to the virtual LAN and are adjacent to the node, excluding a sender of the request packet received, and sends a reply packet including the sender's address (sender address), an address of the node that is a replying node (replying node address), and the count value to a given return destination, and an analysis step in which the given return destination collects the reply packets sent thereto and detects topology of the nodes constituting the virtual LAN from information contained in the reply packets.

The analysis step comprises a step of creating a table of records comprising count value entries, sender address entries, and replying node address entries from the collected packets, a step of sorting the records in the table by the count value entries as a first key and by the sender entries as a second key, a step of joining the sender node and the replying node in each record and plotting sender nodes with the same sender address as a convergence point, and a step of determining the virtual LAN topology by analyzing the records in the table in order.

The count value is either TTL (Time To Live) or hop count from the arbitrary node.

The request packet may include the sender address and the number of a sending port through which the request packet is sent. The reply packet may include the sending port number as well as the sender address and the number of a receiving port through which the request packet was received as well as the replying node address. The analysis step may include a step of creating a table of records comprising count value entries, sender address entries, sending port number entries, replying node address entries, and receiving port number entries from the collected packets.

In a second aspect of the present invention, a method for detecting virtual LAN topology comprises a step in which an arbitrary node that indisputably belongs to the virtual LAN sends a first request packet including a count value indicating the number of communication hops across nodes and an initial value of the count to each of its adjacent nodes that belong to the virtual LAN and are adjacent, a step in which, upon receiving the request packet, each of the nodes sets its node address for a source address of the first request packet received, sends the packet as a first reply packet to a given return destination, and sends the first request packet in which the count value is incremented or decremented, as predetermined, to each of its adjacent nodes that belong to the virtual LAN and are adjacent to the node, excluding a sender of the first request packet received, a step in which the given return destination collects reply packets sent thereto and makes a list of nodes per hop count, based on the count values and the initial values included in the reply packets, a sweep check step in which the arbitrary node sends, to a node to be checked, a second request packet in which the number of hops up to the node to be checked is set as the count value and the initial value and repeats sending the packet until the set number of hops becomes 1, a step in which, upon receiving the second request packet, each of the nodes sets the initial value for the count value in the second request packet, sets its node address for a source address of the second request packet received, and sends the packet as a second reply packet to the given return destination, and a step in which the given return destination assigns a node for the node to be checked from the nodes list in descending order in the hop counts and repeats the sweep check step until interconnections of all nodes in the nodes list are ascertained.

BRIEF DESCRIPTION OF THE DRAWINGS

FIG. 2A shows how packets are forwarded in a virtual LAN where keeping track of topology (states of connections) of nodes on the VLAN is implemented according to a first embodiment of the present invention;

FIG. 2B shows an adjacent nodes table; and FIG. 2C shows a discovered topology;

FIG. 3 is a block diagram showing an example of structure of an operation system 30a;

FIG. 4 is a schematic block diagram showing an example of structure of a node device 10a;

FIG. 7 is a flowchart explaining how a node device 10a other than the verification requesting NE operates when receiving a packet;

FIGS. 10A through 10C are diagrams showing the phases of the process in which the virtual LAN topology is determined;

FIG. 11 shows another form of adjacent nodes table;

FIG. 17 is a flowchart of the process of determining a virtual LAN topology, based on the TTL sweep check for a node with the maximum hops, according to the second embodiment of the present invention.

DETAILED DESCRIPTION OF THE PREFERRED EMBODIMENTS

Figure 1:
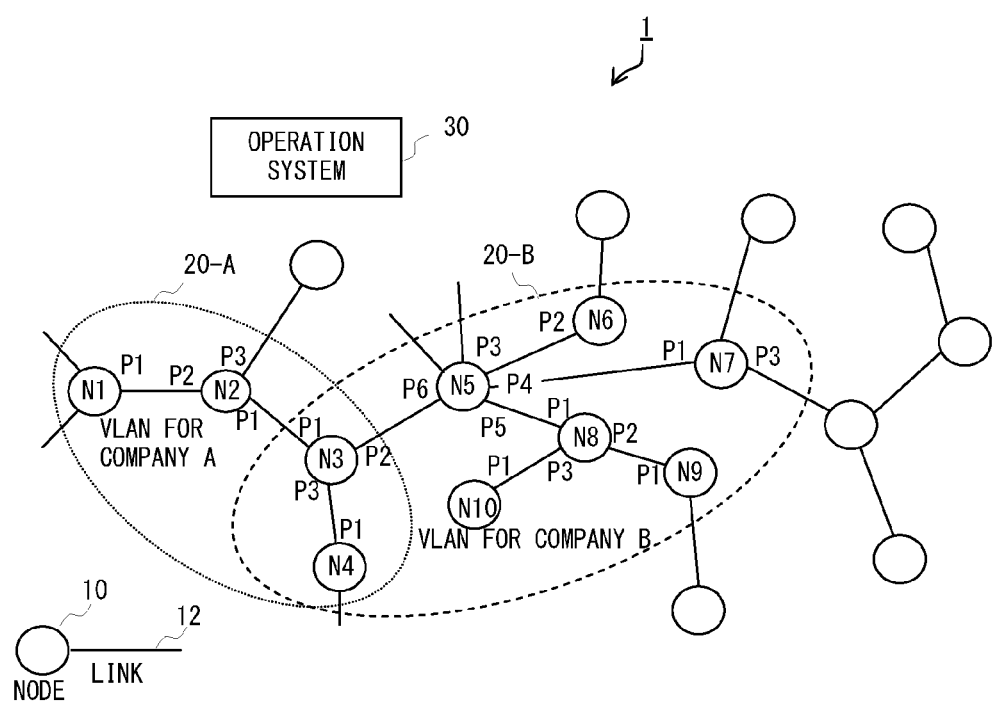
FIG. 1 is a diagram showing an example of communications network infrastructure that a carrier possesses.

The present invention now is described more fully hereinafter through its preferred embodiments and accompanying drawings. Same reference numerals or symbols are used to identify same components across a plurality of drawings.

First Embodiment

FIGS. 2A through 2C are provided to explain a method for keeping track of topology (the states of nodes interconnections) of a given virtual LAN, according to a first embodiment of the present invention.

FIG. 2A is a diagram showing a configuration example of a virtual LAN where keeping track of the states of nodes interconnections can be implemented by the first embodiment of the present invention (FIGS. 2B and 2C will be described later).

The network system of FIG. 2A is the same as the virtual LAN for company B in FIG. 1, except that the nodes, virtual LAN, and operation system are identified by references 10a, 20a, 30a instead of 10, 20, 30.

FIG. 3 is a block diagram showing an example of structure of the operation system 30a in FIG. 2A.

In FIG. 3, the operation system 30a that is a network management system of the present invention comprises a computer-base control section 31, a large-capacity storage device 32 which stores virtual LAN description data 33 describing virtual LAN services that the carrier provides and diverse programs 34, and a communication section 35 to communicate with the nodes. The operation system 30a may be the same as an ordinary network management system, except that the suite of programs includes a program for determining virtual LAN topology by the present invention.

Figure 4:
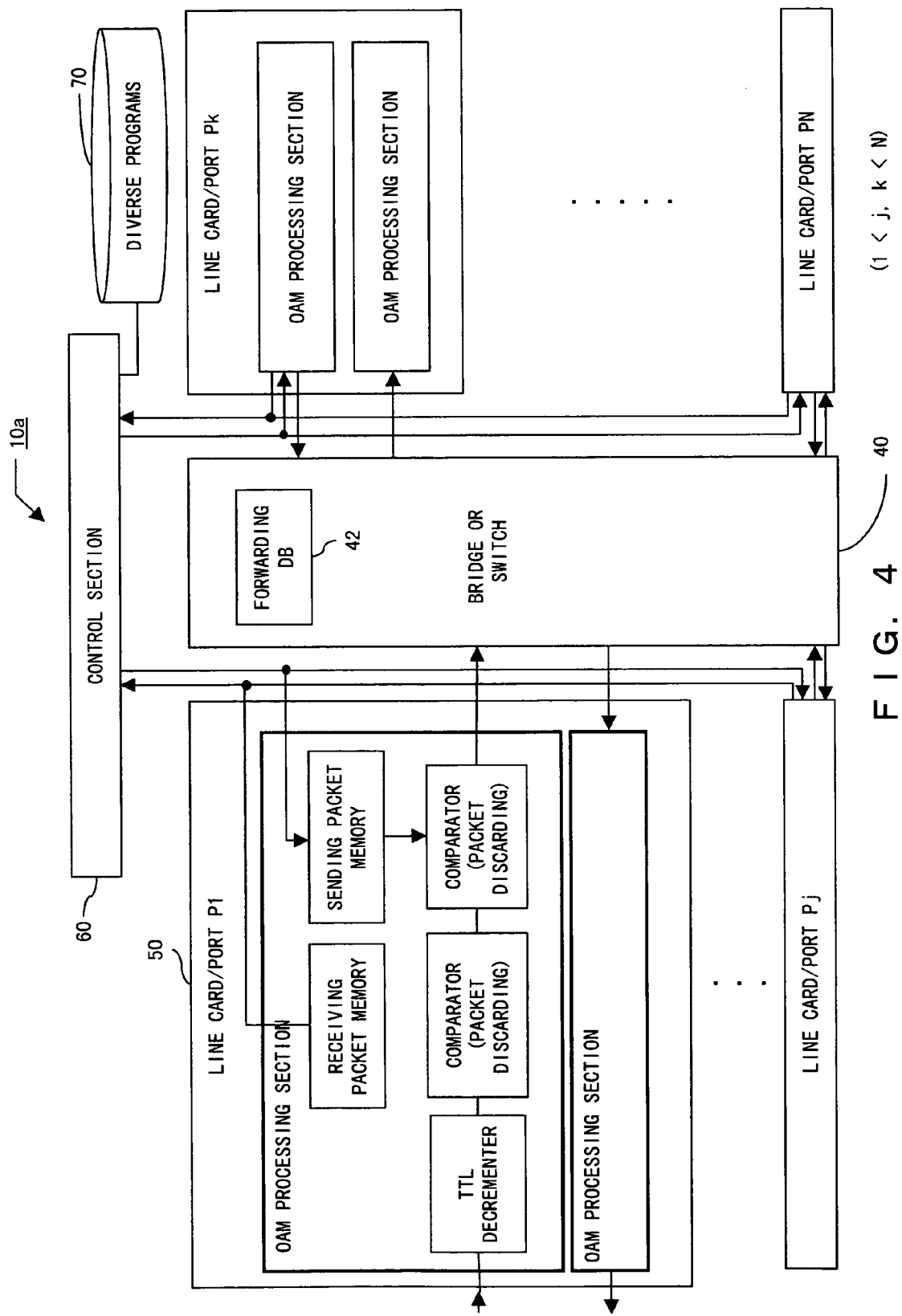

FIG. 4 is a schematic block diagram showing an example of structure of a node device 10a in FIG. 2. In FIG. 4, the node device 10a comprises a bridge or switch 40, at least one line card 50 which is connected to the bridge or switch 40 and carries out communication with another node, a control section 60 which carries out overall control of the node device, and an external storage device 70 to store data and programs to be used by the control section 60.

Line cards 50 are assigned port numbers P1 to Pj and Pk to PN (N is the number of the line cards, 1<j, and k<N). The bridge or switch 40 includes a forwarding database (FDB) 42 for data required for node-to-node forwarding of data packets.

Figure 5:
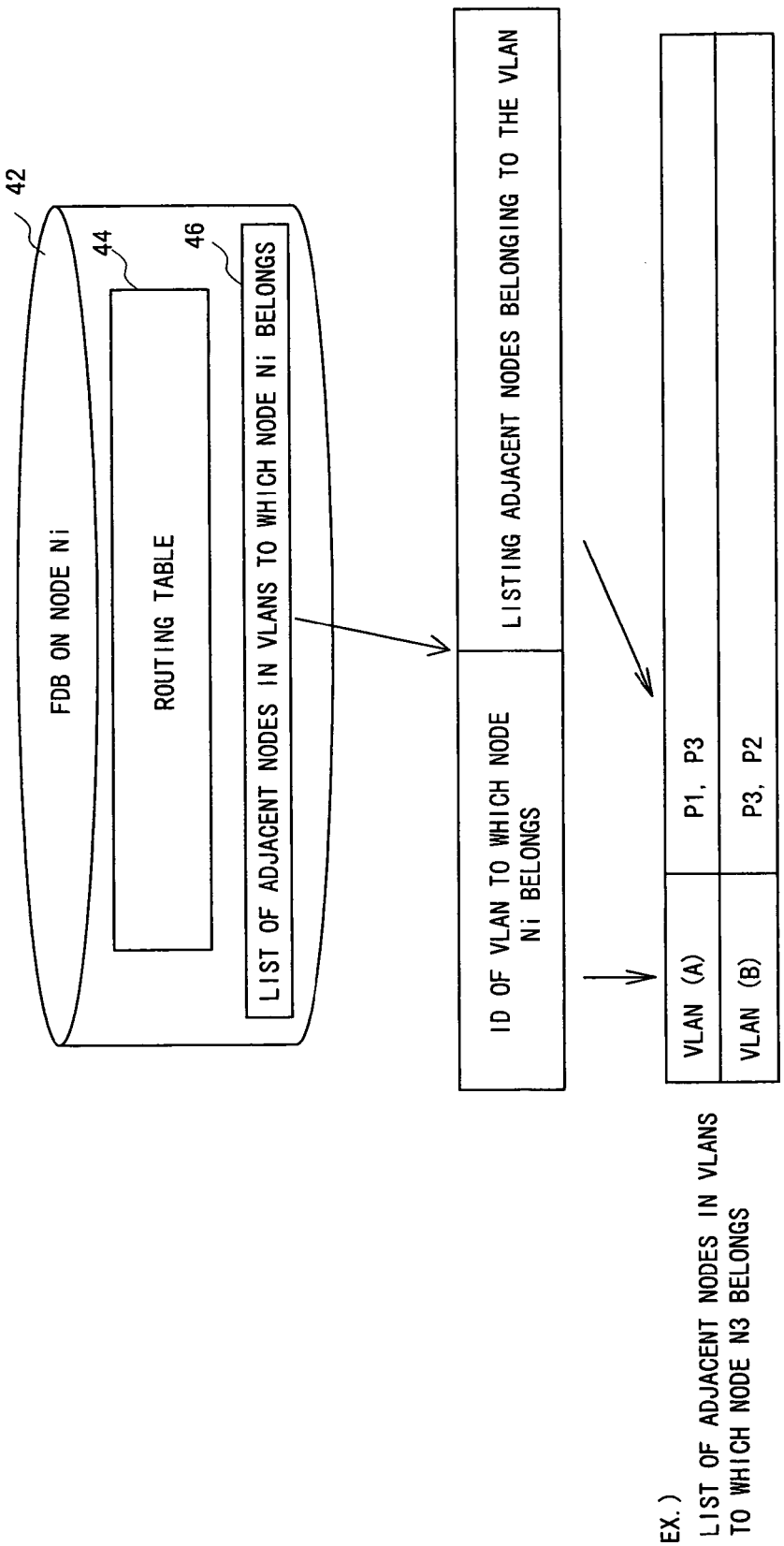
FIG. 5 is a diagram showing an organization of a forwarding DB held on a node identified by Ni.

FIG. 5 is a diagram showing an organization of the forwarding database FDB 42 held on a node identified by Ni. The FDB 42 at least includes a routing table 44 which is used for node-to-node forwarding of packets and a list of adjacent nodes 46 in virtual LANs to which the node Ni may belong.

The adjacent nodes list 46 is a list of port numbers of the node Ni toward nodes that are respectively included in virtual LANs to which the node Ni may belong and adjacent to the node Ni and this list is used to forward a request packet to verify virtual LAN configuration according to the present invention as will be described in detail later.

Because there is a possibility that one node is used in (belongs to) a plurality of virtual LANs, the adjacent nodes list 46 lists the IDs of the virtual LANs to which the node belongs and the port numbers toward the adjacent nodes belonging to the virtual LANs per virtual LAN to which the node belongs.

Referring to FIG. 2A, for example, a node N3 in FIG. 2A is used in both virtual LANs for company A and company B and, therefore, if the virtual LANs are identified by VLAN (A) and VLAN (B), P1 (its port number toward N2) and P3 (its port number toward N4) are associated with VLAN (A) and P3 (its port number toward N4) and P2 (its port number toward N5) are associated with VLAN (B).

The node device 10a may be any node device that includes the adjacent nodes list per virtual LAN on the FDB 42 as described above and operates under control of a program for verifying virtual LAN configuration which will be described later.

Now, the principle of the first embodiment of the present invention is described. The operation of verifying (or keeping track of) virtual LAN configuration according to the present invention starts with action (1) in which the operation system 30a directs one of the nodes constituting a virtual LAN whose configuration should be verified (which is referred to as the "virtual LAN to be verified") to multicast request packets to verify virtual LAN configuration (these packets will be referred to simply as "request packets" hereinafter) including the ID of the virtual LAN to be verified. This node that initially sends the request packets is referred to as the "verification requesting node" or "verification requesting NE (network element)." Of course, it is assumed as a certain fact that this verification requesting node belongs to the virtual LAN to be verified.

A node that has received a request packet returns a reply packet to the requesting node (2a) and multicasts request packets to its adjacent nodes that have not received request packets yet (2b) (far-end nodes do not perform action 2b).

(3) The verification requesting NE extracts necessary information from the reply packets thus returned from the nodes constituting the virtual LAN other than itself, analyzes the information, and obtains the connectivity and interconnections on the virtual LAN to be verified.

The above operation will be explained in particular, taking the VLAN for company B in FIG. 2A as an example. First, (1) the operation system 30a directs a node N3 to send request packets to its adjacent nodes N4 and N5. Then, the node N5 that received a request packet returns a reply packet RP5 (2a) and multicasts request packets to its adjacent nodes N6 to N8 that have not received request packets yet (2b) (this is not required for the far-end nodes to do).

Other nodes N4 and N6 to N10 perform action (2) and return reply packets RP4 to RP10 to the verification requesting NE. Based on the collected reply packets RP4 to RP10, (3) the operation system 30a or the verification requesting NE creates an adjacent nodes table 48 like the one shown in FIG. 2B, analyzes this adjacent nodes table 48, and verifies the topology of the virtual LAN to be verified like the one shown in FIG. 2C.

In the following, the first embodiment will be described in more detail.

Figure 6:
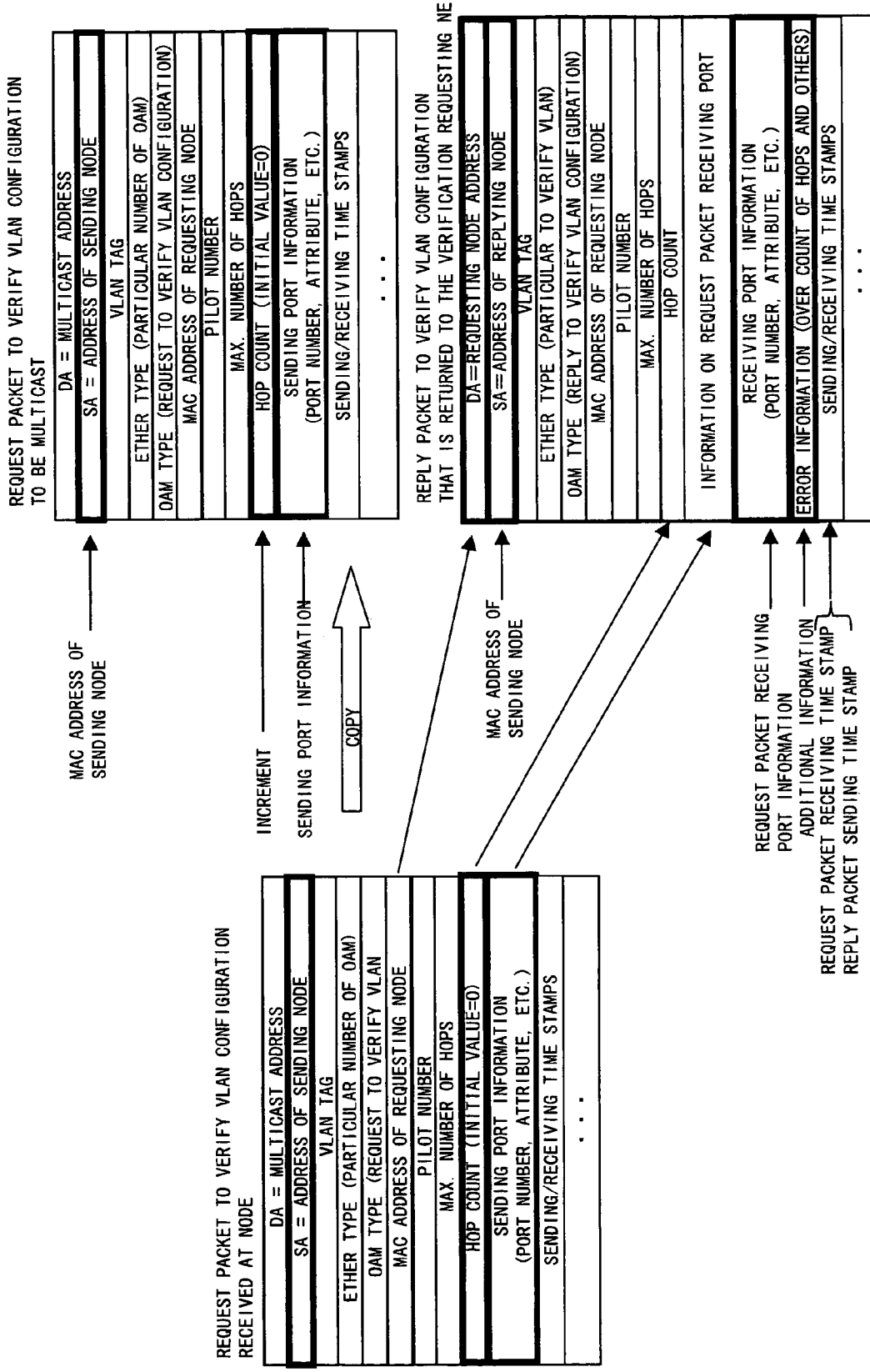
FIG. 6 is a diagram showing examples of the structures of a request packet to verify virtual LAN configuration, a new request packet for the verification which is generated when a node other than the verification requesting NE receives the request packet to verify virtual LAN configuration, and a reply packet.

FIG. 6 is a diagram showing examples of the structures of a request packet to verify virtual LAN configuration, a request packet for the verification updated to be further multicast when receiving the request packet to verify virtual LAN configuration, and a reply packet generated in accordance with the first embodiment.

<Request Packet to Verify Virtual LAN Configuration>

The request packet to verify virtual LAN configuration contains information items enumerated in Table 1 below.

| Field name | What is contained in the field |
| --- | --- |
| Destination address (DA) | Multicast address |
| Source address (SA) | MAC address of the source node (the sender of this packet) |
| VPID/TCI | Virtual LAN tag, the ID of the virtual LAN to be verified |
| Ether type | Particular number assigned for OAN |
| Version | OAM function version number |
| OAM type | OAM packet type designator<br>0x31: request packet<br>0x32: reply packet |
| Requesting node MAC address | MAC address of requesting NE to verify virtual LAN configuration (to be given as the destination in a reply packet) |
| Pilot number | Identifiers of request packets from the verification requesting NE (serial numbers from 0x01 assigned to request packets to be sent from a plurality of ports) |
| Max. number of hops | The number of allowable hops from the verification requesting NE (request packet forwarding more than the max. hops is not performed.) |
| Hop count | The number of hops from the Verification requesting NE (the verification requesting NE has a hop count of 0) |
| Sending port information | Port number and attribute, etc.<br>- IP address of the NE that sends the request packet<br>- MAC address of the NE that sends the request packet<br>- ID of a sending port of the NE that sends the request packet |
| PAD | Padding data for packet length adjustment |
| FCS | Frame check sequence (data for checking the packet data) |
| Time at which the packet is sent from the node | Time at which the request packet is sent |
| Time at which the packet Is received at a node | Time at which the request packet is received (empty when this packet is sent) |
| Time at which a reply is sent from the receiving node | Time at which a reply packet is sent (empty when this packet is sent) |
| Time at which the reply Is received at the sending node | Time at which the reply packet is received (empty when this packet is sent) |

In FIG. 6, PAD and FCS are omitted. The request/reply packets that are used for detecting virtual LAN configuration in the present invention are generally referred to as packets for OAM (operation administration and maintenance).

According to the present embodiment, request packets that are sent by nodes including the verification requesting NE basically have the structure described in the above Table 1, but difference between the request packet that is sent by the verification requesting NE and the request packets that are sent by other nodes lies in the following respects.

The verification requesting NE or operation system 30a generates a request packet in which it sets a multicast address in the destination address (DA) field, the MAC address of the verification requesting NE in the source address (SA) field, the ID of the virtual LAN to be verified in the VPID/TCI field, the current version number of the OAM program in the version field, the designator of the type (e.g., 0x01 that designates a request packet) of the OAM packet (that is used in the operation of verifying virtual LAN configuration by the present invention) in the OAM type field, 0x01, if the packet is sent to node N4, or 0x02 if the packet is sent to node N5 in the pilot number field, the number of allowable hops from the verification requesting NE in the maximum number of hops field, and an initial value of 0x00 in the hop count field.

As for sending port ID in the sending port information field, Because one packet is sent through port P3 to node N4 and another packet is sent through port P2 to node N5, as shown in FIG. 2A, P3 is set as the sending port ID if the request packet is sent to node 4 or P2 is set as the sending port ID if the request packet is sent to node 5.

The packet includes the fields for time at which the packet is sent from the node, time at which the packet is received at a node, time at which a reply is sent from the receiving node, time at which the reply is received at the sending node, which are not mandatory, so that round trip time (RTT) can be measured accurately. In the field for time at which the packet is sent from the node, the sending time stamp may be given when sending the request packet to verify virtual LAN configuration.

<Updating the Request Packet to Verify Virtual LAN Configuration>

On the other hand, a node other than the verification requesting NE must modify the contents of the request packet it received and multicast modified request packets. In particular, the node changes the source address to its MAC address and increments the hop count. Moreover, the node changes the sending port information to the information for its ports through which to send the thus modified request packets and sends the packets.

As seen from the above description, in the first embodiment, a request packet sent from the verification requesting NE is forwarded to the next hop only, not passed on to further nodes as is in the virtual LAN. Instead, the node that received the request packet modifies its contents to make it into a request packet to be sent from there (but, the ID of the verification requesting NE remains in the requesting MAC address field) and multicasts the modified one.

<Reply Packet>

When each node receives the request packet, it returns a reply packet like the one which is shown at lower right in FIG. 6 to the verification requesting NE. The structure of the reply packet comprises the request packet fields with addition of a receiving port information field and an error information field. Therefore, after the receiving node creates a copy of the received request packet, it must copy the MAC address of the requesting node to the destination address DA field, set its MAC address in the source address SA field, write the information on the port through which it received the request packet in the receiving port information field, and, if the hop count exceeds the maximum number of hops, write an overrun of hops in the error information field. The hop count and sending port information remain as is (that is, copied data remains).

The receiving port information field at least includes the IP address and MAC address of the NE that received the request packet (sender of the reply packet) and the receiving port number of the NE that received the request packet.

As described above, the request packet may include the fields for time at which the packet is sent from the node, time at which the packet is received at a node, time at which a reply is sent from the receiving node, time at which the reply is received at the sending node. If the request packet includes these fields, the receiving node gives the time at which it received the request in the field for time at which the packet is received and the reply packet sending time stamp in the field for time at which a reply is sent from the receiving node in addition to the above information provisioning. This enables the verification requesting NE to carry out accurate measurement of RTT.

After the verification requesting NE multicasts request packets as described hereinbefore, subsequent operations for keeping track of virtual LAN configuration will be described with reference to flowcharts in FIGS. 7 through 9.

FIG. 7 explains how a node device 10a other than the verification requesting NE operates when receiving a packet. Referring to FIG. 7, the node first increments the hop count in step 102 and determines whether the hop count is equal to the maximum number of hops in a decision step 104.

If the hop count is equal to the maximum number of hops, the node regards it as abnormal, discards the received packet in step 106, and terminates the packet receive processing.

In the decision step 104, if the hop count is not equal to the maximum number of hops (hop count<maximum number of hops), the node determines whether the destination address (DA) is its MAC address in a decision step 110. If not, then the packet's destination is some other node and, therefore, the node forwards the packet to the some other node, referring to the FDB 42, and terminates the packet receive processing in step 112.

In the decision step 110, if the packet's destination is the node, the node determines whether the received packet is a request packet to verify virtual LAN configuration in a further decision step 114. If the received packet is not the request packet, then it is an ordinary packet addressed to the node. Then, the node performs receive processing for the packet in step 116 and terminates the packet receive processing in FIG. 7.

In the decision step 114, if the received packet is determined as the request packet to verify virtual LAN configuration, the process goes to step 120 where the node generates a reply packet, as described in the above reply packet section, and sends the reply packet to the verification requesting NE. Furthermore, in step 122, the node updates the received request packet to new request packets to be multicast and sends the new request packets to its adjacent nodes associated with the ID of the virtual LAN identified by the virtual LAN tag (that is, the virtual LAN whose configuration is going to be verified now) in the adjacent nodes list 46 and terminates the packet receive processing in FIG. 7. Steps 120 and 122 may be reversed in order.

Through the above procedure, upon receiving a request packet, a node other than the verification requesting NE returns a reply packet to the verification requesting NE and multicasts updated request packets to other nodes in the multicast domain of the virtual LAN whose configuration is going to be verified. In this way, reply packets are sent from nodes other than the verification requesting NE to the verification requesting NE. Thus, the verification requesting NE has to enter a reply packet receiving mode immediately after multicasting request packets to verify virtual LAN configuration.

Figure 8:
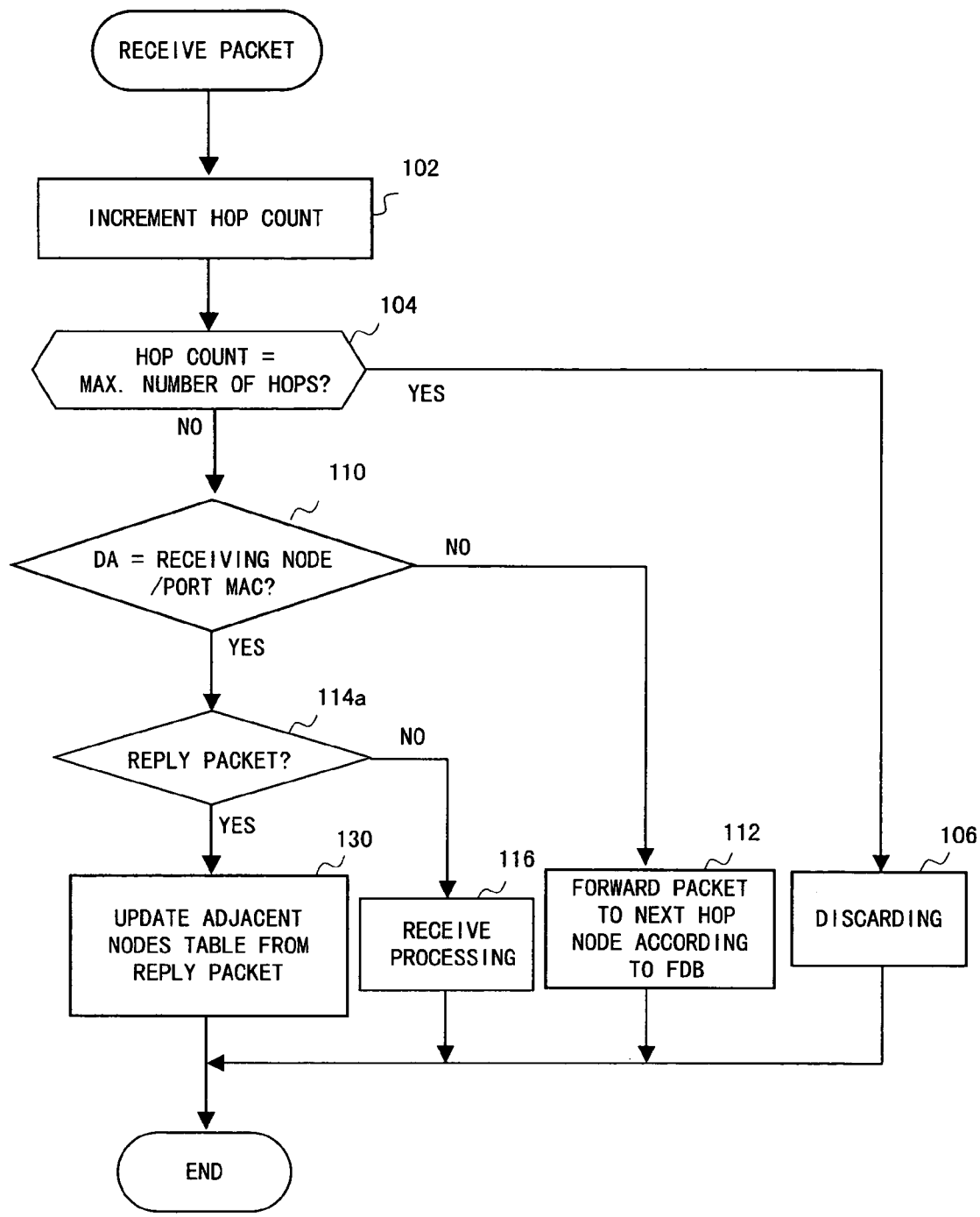
FIG. 8 is a flowchart explaining how the verification requesting NE operates when receiving a packet.

FIG. 8 explains how the verification requesting NE operates when receiving a packet. The packet receive processing by the verification requesting NE in FIG. 8 is the same as the packet receive processing in FIG. 7, except that step 114a replaces step 114 and step 130 replaces the routine consisting of steps 120 and 122, and, therefore, only these differences are explained.

The verification requesting NE determines whether the received packet is a reply packet in step 114a. If not, the process goes to the above-described step 116.

If the received packet is a reply packet, the process goes to step 130 where the NE makes the adjacent nodes table 48 like the one shown in FIG. 2B from the contents of the reply packet.

Specifically, each time the verification requesting NE receives a reply packet, it adds a record consisting of the hop count from the received packet, the number of hops derived from the sending port information and receiving port information, sending node ID, sending port number, receiving node ID, and receiving port number to the adjacent nodes table 48, there by making the adjacent nodes table 48.

In the table example of FIG. 2B, the adjacent nodes table 48 is made, containing seven records obtained from reply packets RP4 to RP10 from nodes N4 to N10 belonging to the virtual LAN to be verified. From the adjacent nodes table 48 thus prepared, a virtual LAN topology can be determined, as is shown in FIG. 2C.

Making the adjacent nodes table 48 in FIG. 2B and determining the virtual LAN topology in FIG. 2C may be performed by the verification requesting NE itself or may be performed by the operation system 30a after the verification requesting NE transfers collected reply packets to the operation system 30a.

Figure 9:
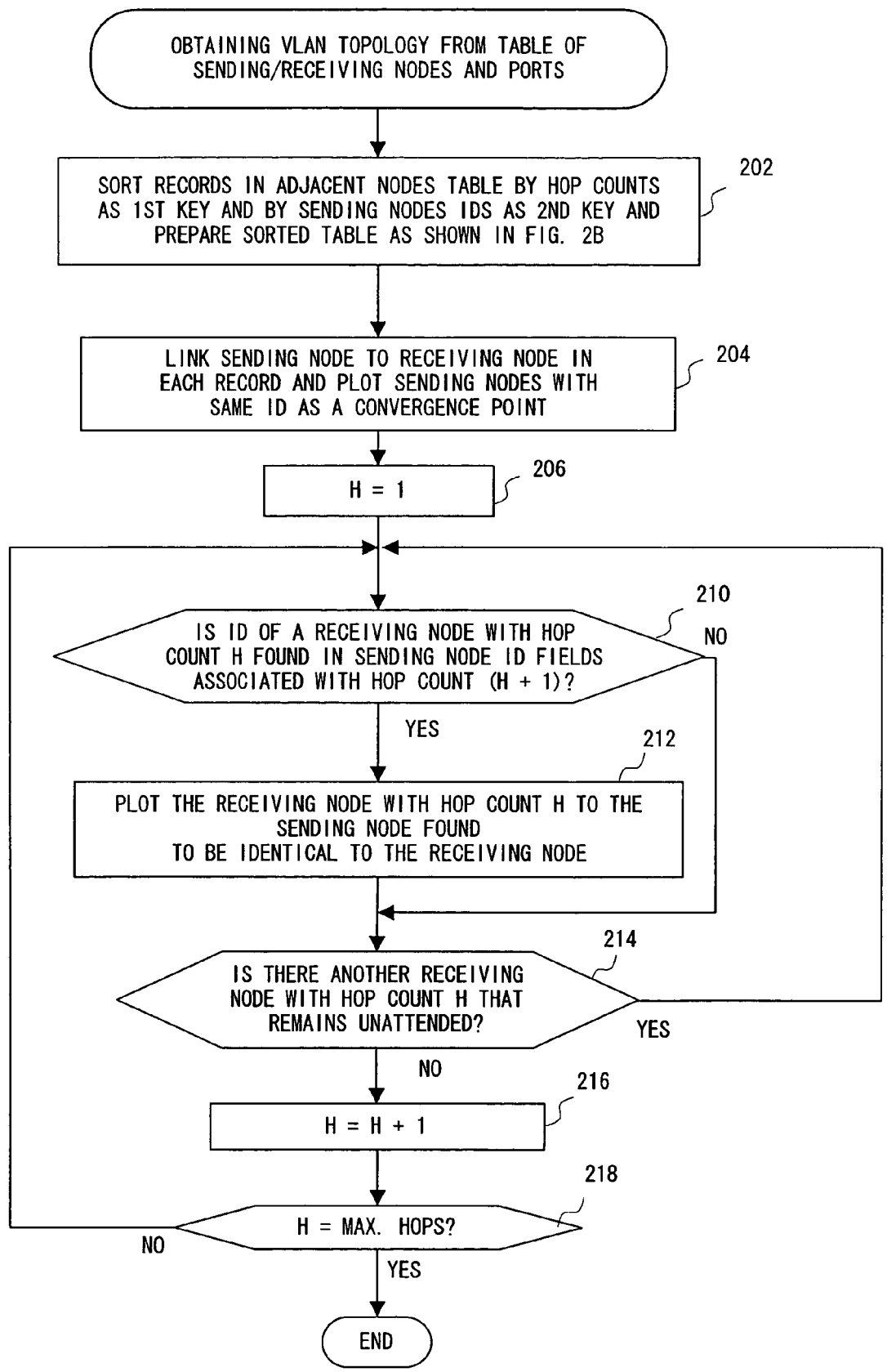
FIG. 9 is a flowchart explaining a process of determining a virtual LAN topology in ascending order in the number of hops, using the adjacent nodes table 48.

FIG. 9 is a flowchart explaining a process of determining the states of nodes interconnection on the virtual LAN in ascending order in the hop counts, using the adjacent nodes table 48 in FIG. 2B.

Referring to FIG. 9. in step 202, the records in the adjacent nodes table 48 in FIG. 2B are sorted in ascending order in the hop counts, which are used as a first key, and in the IDs of sending nodes, which are used as a second key; that is, the records are sorted by the hop counts and further sorted by the IDs of sending nodes. In FIG. 2B, the adjacent nodes table 48 in which the records have been sorted in this way is shown.

Next, in step 204, the sending node and the receiving node in each record are joined. At this time, the sending nodes with the same ID are plotted as a convergence point.

FIG. 10 is a set of diagrams showing the phases of the process in which the virtual LAN topology is determined according to the procedure of FIG. 9. Referring to FIG. 10A, the right-hand nodes correspond to the receiving nodes in the adjacent nodes table 48 in FIG. 2B and the left-hand nodes correspond to the sending nodes in the adjacent nodes table 48. FIG. 10A shows the result of execution of step 204.

Returning to FIG. 9, next, in step 206, 1 is assigned to a variable H that represents a hop count.

Next, in step 210, it is determined whether the ID of a receiving node with the value of hop count H is found in the sending node fields associated with a hop count (H+1). If not, the process goes to step 214.

In FIG. 2B and FIG. 10A, for example, N4 that is the ID of a receiving node N4 with the hop count H=1 is not found in the sending node fields associated with the hop count H=2 (this means that N4 is a far-end node), and, therefore, nothing is performed here and the process goes to the decision step 214 in FIG. 9.

Figure 10B:
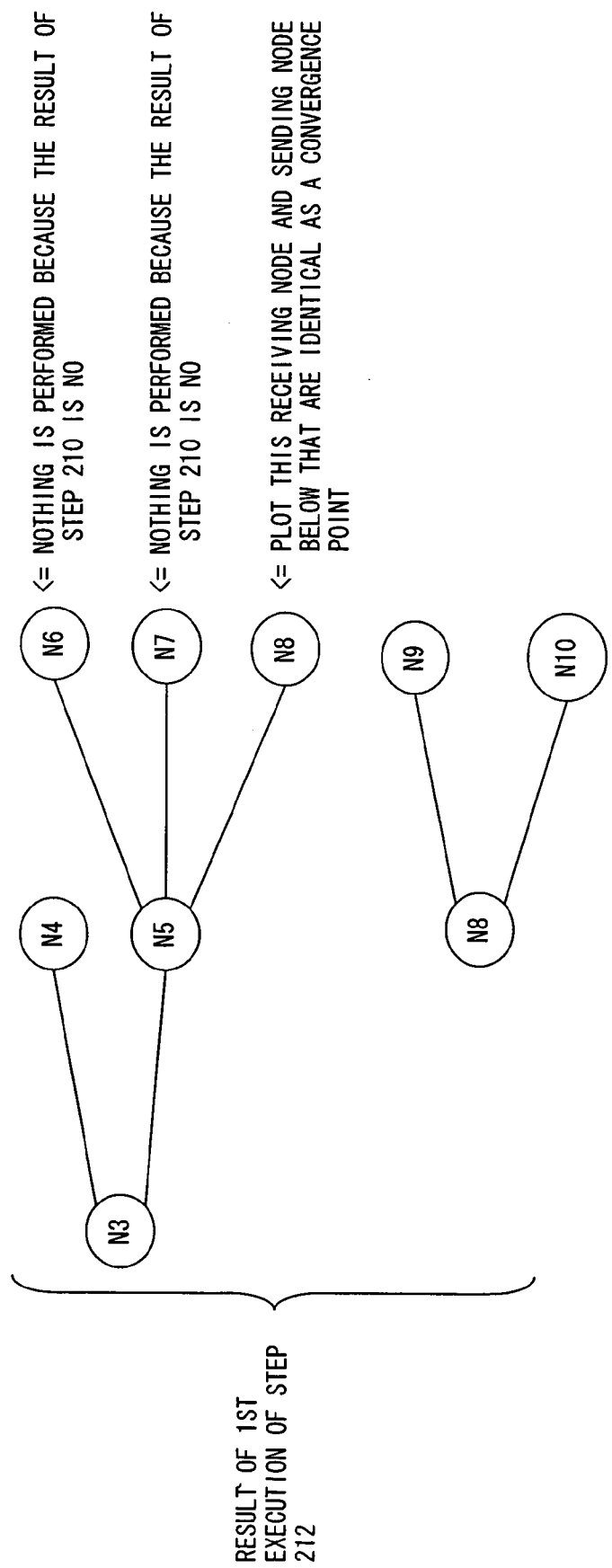

If the result of the decision is YES in the decision step 210, the process goes to step 212 where the receiving node with the value of hop count H and other receiving nodes joined to the sending node found to be identical to that receiving node are jointed. For example, N5 that is the ID of a receiving node N5 with the hop count H=1 is found in the sending node ID fields associated with the hop count H=2. Thus, the receiving node N5 and the sending node N5 are plotted as a convergence point; that is, the receiving node N5 and other receiving nodes N6 to N8 connected to the sending node N5 are jointed. Then, a part of the topology that has been discovered now is as shown in FIG. 10B.

If the result of the decision step 210 is NO or when the step 212 is finished, the process goes to the decision step 214 where it is determined whether there is another receiving node with the value of hop count H (which is 1 at this stage in this example) that remains unattended. If so, the process returns to step 210.

If there is no receiving node with the value of hop count H (which is 1 at this stage in this example) that remains unattended, the process goes to step 216 where the variable H is incremented and, in a further decision step 218, it is determined whether the variable H has reached the maximum number of hops.

If the variable H does not reach the maximum number of hops, the process returns to step 210. At this stage in this example, the variable H is 2, after incremented in step 216, and does not reach the maximum number of hops. Thus, the process returns t step 210 and steps 210 and 212 are executed again. As the result, the topology shown in FIG. 10C is obtained.

In the decision step 218, if it is determined that the variable H has reached the maximum number of hops, the process in FIG. 9 terminates.

According to the present invention, even if the addresses of the nodes constituting a virtual LAN are unidentifiable, it is possible to keep track of the states of the nodes interconnections on the virtual LAN.

<Determining the Topology in Descending Order in the Hop Counts>

In the foregoing example, from the adjacent nodes table 48 in FIG. 2B, the topology is obtained by laying out the nodes in ascending order in the hop counts (positioning the verification requesting NE as the origin). However, it is also possible to obtain the topology by laying out the nodes in descending order inversely (from far-end nodes away from the verification requesting NE). This method will be described below.

FIG. 11 shows another form of adjacent nodes table 48a. In FIG. 11, each record in the adjacent nodes table 48a consists of the entries of hop count, receiving node ID, receiving port number, sending node ID, and sending port number.

Figure 12:
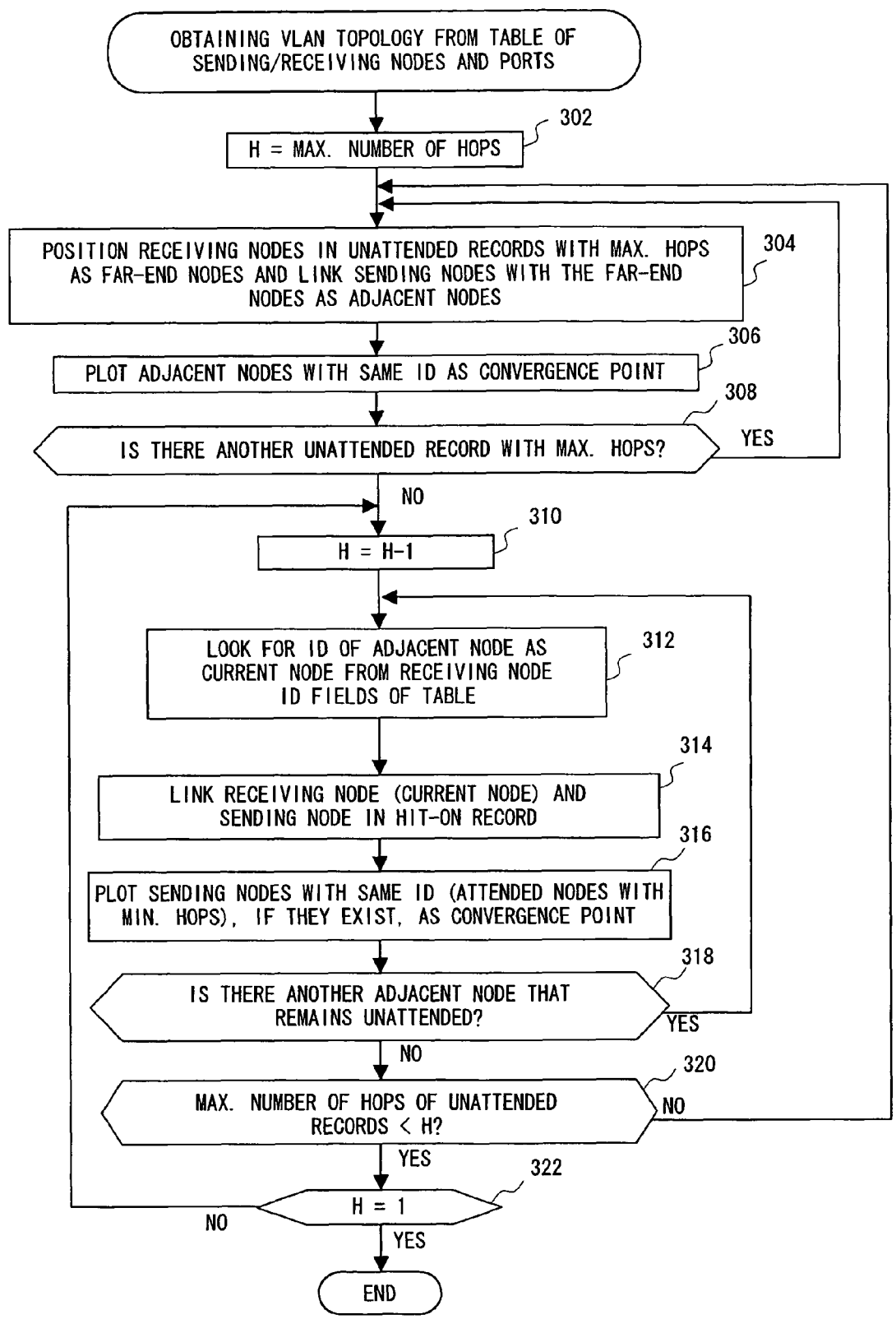
FIG. 12 is a flowchart explaining the process of determining a virtual LAN topology in descending order in the hop counts, using the adjacent nodes table.

FIG. 12 is a flowchart explaining the process of determining the states of the nodes interconnections on the virtual LAN in descending order in the hop counts, using the adjacent nodes table 48a in FIG. 11.

Referring to FIG. 12, first, in step 302, the variable H is set at the maximum number of hops. In step 304, the receiving nodes in unattended records with the maximum hops are positioned as far-end nodes and the sending nodes are linked with the far-end nodes as adjacent nodes. In step 306, adjacent nodes with the same ID are plotted as a convergence point.

Next, in a decision step 308, it is determined whether there is another unattended record with the maximum hops. If so, the process returns to step 304. If not, the process goes to step 310 where the variable H is decremented.

Next, in step 312, the ID of an adjacent node as the current node is looked for from the receiving node ID (or number) fields of the table. In step 314, the receiving node (current node) and the sending node in the hit-on record are linked.

In step 316, sending nodes with the same ID (attended nodes with minimum hops), if they exist, are plotted as a convergence point. Furthermore, in a decision step 318, it is determined whether there is another adjacent node that remains unattended. If so, the process returns to step 312.

In step 318, if there is not adjacent node that remains unattended, the process goes to a decision step 320 where it is determined whether the maximum number of hops of unattended records is smaller than the variable H. If not, the process returns to step 310. If so, process in FIG. 12 terminates.

Through this method as well, the topology of the virtual LAN as shown in FIG. 2C can be obtained from the adjacent nodes table 48a in FIG. 11.

In the above-described method of determining a virtual LAN topology according to the first embodiment of the present invention, there is a possibility that a flood of reply packets arrive at the verification requesting NE immediately after the verification requesting NE sends request packets to verify virtual LAN configuration, resulting in incapability of processing of the reply packets or temporary disability to provide normal services, if a great number of nodes constitute the virtual LAN. It is preferable to take countermeasures so that such trouble can be avoided even if a great number of network nodes exist.

Figure 13:
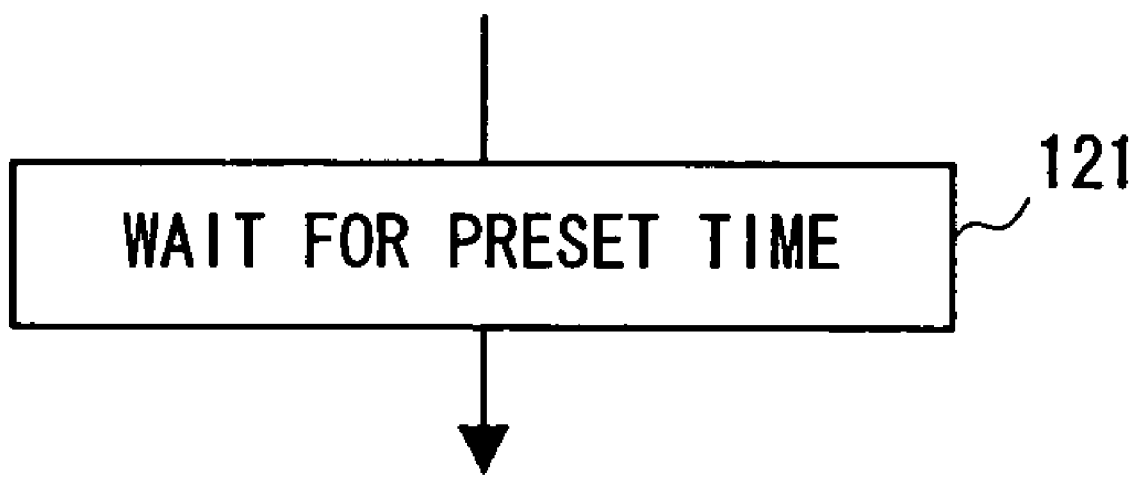
FIG. 13 is a flowchart block comprising a step of delaying the time to return reply packets from nodes with different hop counts, the delay increasing as the hop count increases.

For example, as is illustrated in FIG. 13, during the request packet receive processing on each node, it may be preferable to insert a step 121 of allowing for a time-lag controlled by a timer between steps 120 and 122. Thereby, sending request packets are delayed as the number of hops increases and, accordingly, returning reply packets can be delayed.

In the above example, each node that received a request packet returns a reply packet to the verification requesting NE. Instead, the following two modifications can easily be implemented.

1. A node that received a request packet forwards this packet as is to a downstream adjacent node until the packet arrives at an edge (a terminating node having no further node to which to send the request packet). Only the edge node sends a reply packet and, upon receiving this reply packet, each node on the route adds information on its adjacent nodes to the reply packet, and the reply packet is thus relayed from one node to another and returned to the verification requesting NE. In this way, information for the adjacent nodes on the route from the edge up to the verification requesting NE can be collected.

2. A node that received a request packet adds information on its adjacent nodes to the received request packet and forwards this packet to a downstream adjacent node until the packet arrives at an edge (a terminating node having no further node to which to send the request packet). The edge copies all adjacent nodes information that has been accumulated in the request packet to a reply packet and sends the reply packet to the verification requesting NE. In this way, also, information for the adjacent nodes on the route from the verification requesting NE up to the edge can be collected.

Second Embodiment

Figure 14:
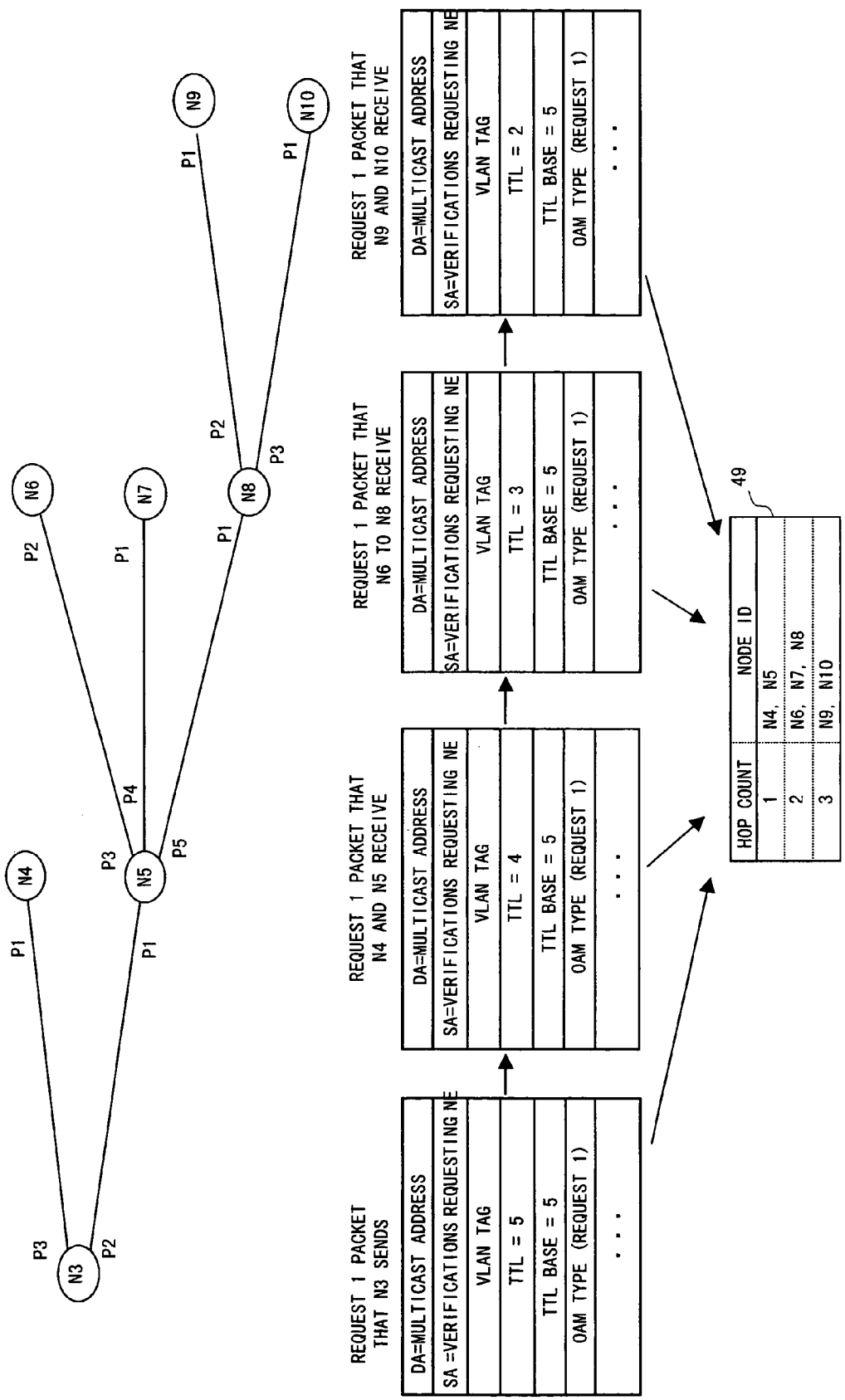
FIG. 14 is a diagram explaining a method of obtaining the addresses of nodes constituting a virtual LAN to be verified and the number of hops from the verification requesting NE, according to a second embodiment of the present invention.

A second embodiment of the present invention is described with reference to FIGS. 14 through 16. FIG. 14 is a diagram illustrating a method in which the verification requesting NE sends first request packets to verify topology hop by hop across a virtual LAN to be verified and obtains the addresses of nodes constituting the virtual LAN to be verified and the number of hops from the verification requesting NE from first reply packets, according to the second embodiment of the present invention.

Referring to FIG. 14, a first request packet to verify topology that the verification requesting NE sends comprises the destination address, source address, VLAN tag which is the ID of the virtual LA to be verified, a value of TTL (Time To Live), TTL base, and OAM type which designates the packet type. The value of TTL is determined, taking the maximum number of allowable hops into consideration. In the example of FIG. 14, the verification requesting NE sends the first request packets with the TTL value=5 and TTL base=6.

Figure 15:
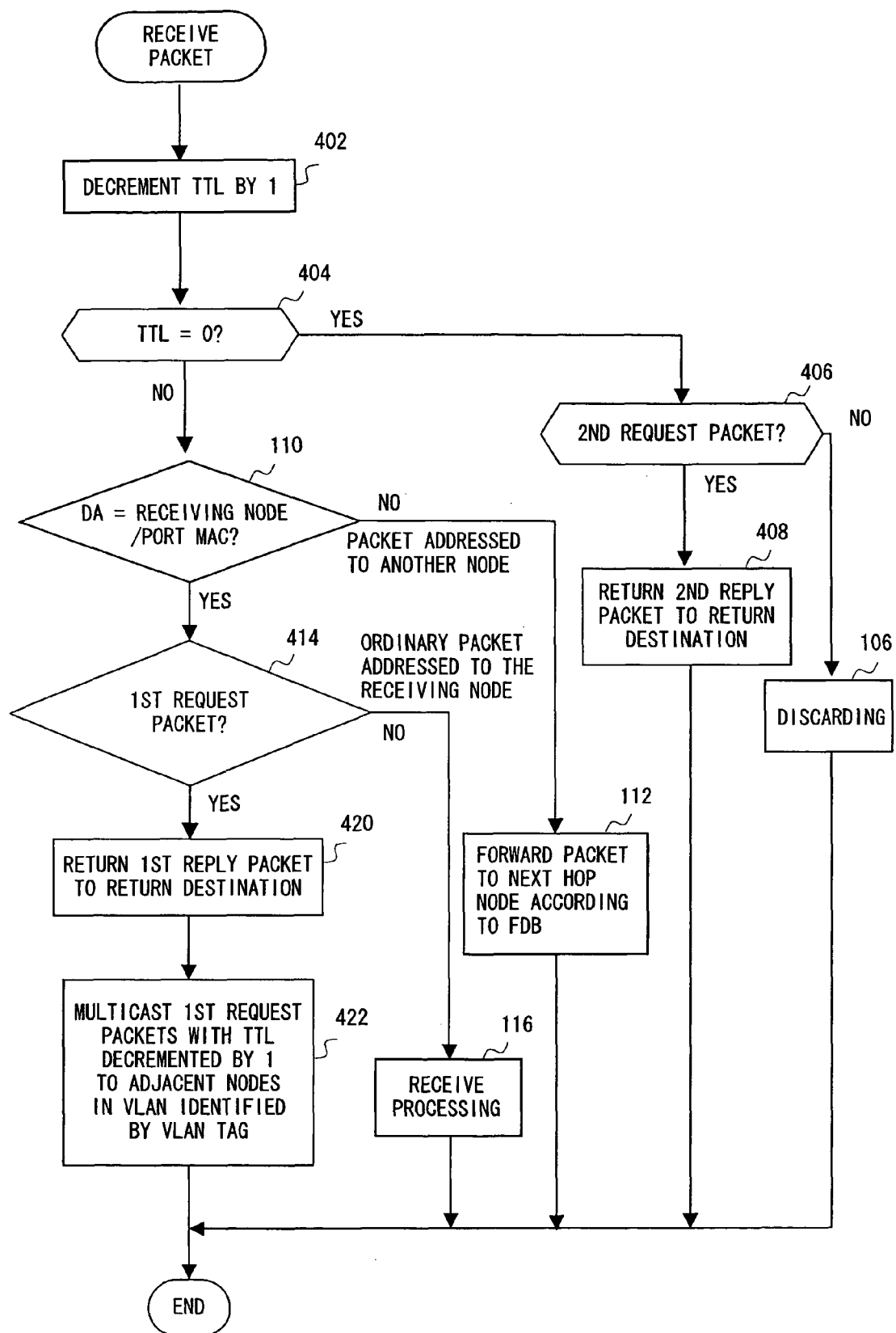
FIG. 15 is a flowchart explaining how a node other than the verification requesting NE operates when receiving a packet in the second embodiment of the present invention.

FIG. 15 is a flowchart explaining how a node other than the verification requesting NE operates when receiving a packet in the second embodiment of the present invention.

The flowchart in FIG. 15 is the same as the flowchart in FIG. 7, except that steps 402, 404, 414, 420, and 422 replace steps 102, 104, 114, 120, and 122 in FIG. 7 respectively and steps 406 and 408 are added. Therefore, only these differences are explained.

When a node other than the verification requesting NE receives a packet, the node first decrements the TTL (by one) in step 402 and determines whether the TTL is 0 in a decision step 404. If the TTL is 0, the process goes to step 406; if the TTL is not 0, the process goes to step 110. Step 406 and subsequent will be described later.

If the received packet is determined as a first request packet in a decision step 414, the node returns a first reply packet to a return destination in step 420. In this case, the return destination may be either the verification requesting NE or the operation system 30a. The first reply packet is a copy of the first request packet in which the TTL is decremented, the MAC address of the return destination is set in the DA (destination address) field, and the MAC address of the node is set in the SA (source address) field.

Furthermore, in step 422, the node forwards first request packets with a value of TTL decremented to its adjacent nodes given in the adjacent nodes list 46 in the VLAN identified by the VLAN tag and terminates the packet receive processing.

Through the above process on all network nodes, the verification requesting NE or the operation system 30a which is the return destination collects first reply packets from the nodes other than the verification requesting NE, can know the hop counts of the nodes constituting the virtual LAN to be verified from the source addresses SA and the TTL values in the reply packets, and can make a list of nodes per hop count 49 as is shown in FIG. 14. Preferably, the nodes in the list of nodes per hop count 49 should be sorted in hop count order.

Next, while referring to the list of nodes per hop count 49, the verification requesting NE determines the topology of the virtual LAN to be verified, based on a TTL sweep check for a node with the maximum hops, as is illustrated in FIG. 17.

FIG. 17 is a flowchart of the process of determining the virtual LAN topology, based on the TTL sweep check for a node with the maximum hops, according to the second embodiment of the present invention.

After making the list of nodes per hop count 49, in step 502, the maximum number of hops is assigned to the hop count variable H. In step 504, a node that falls into the number of the hop count variable H is selected from the list of nodes per hop count 49. The TTL sweep check is performed for the selected node with the maximum hops as illustrated in FIG. 16.

Figure 16:
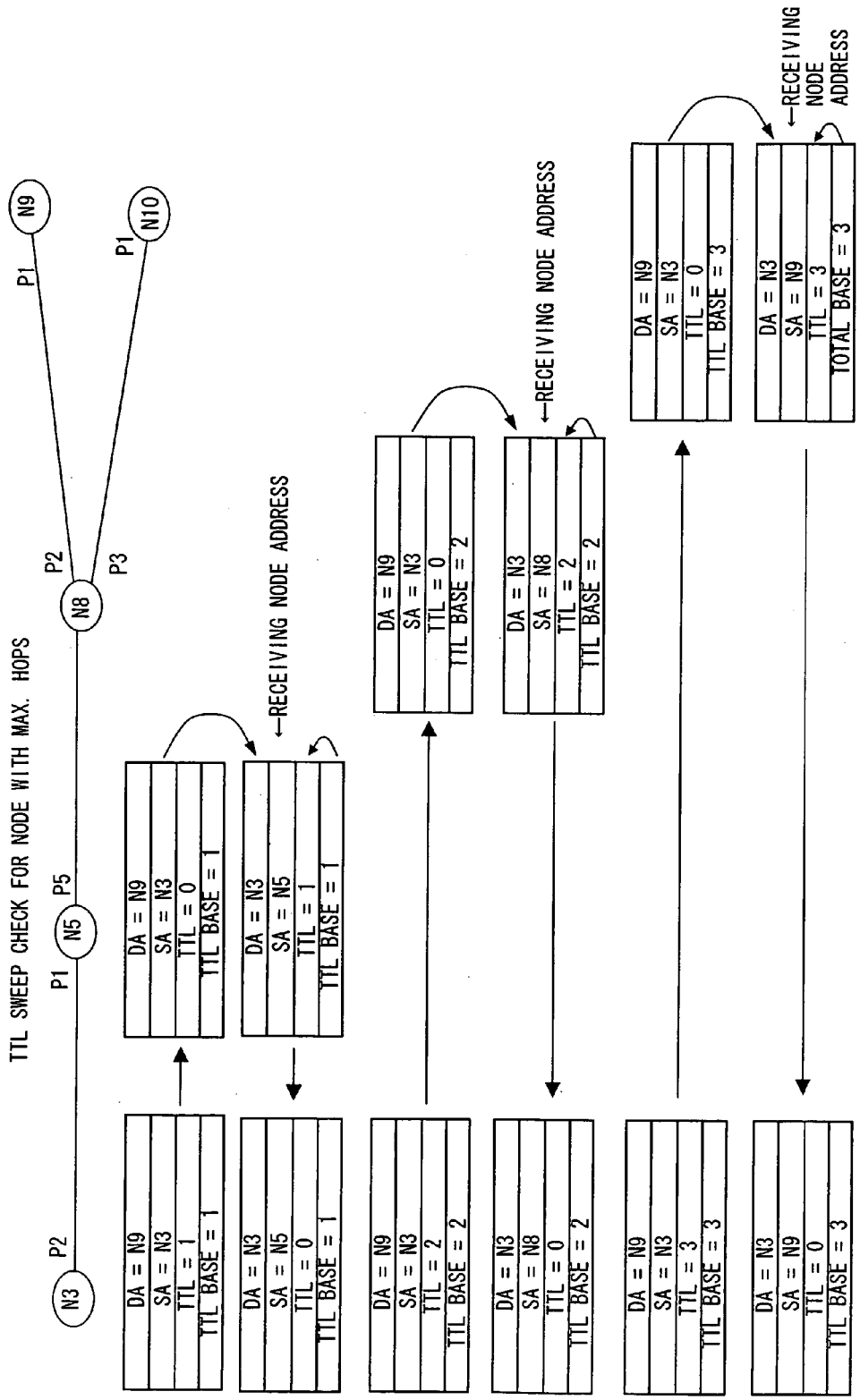
FIG. 16 illustrates an example of TTL sweep check operation for node N9 with a maximum number of hops of 3.

FIG. 16 illustrates an example of TTL sweep check operation for node N9 with a maximum number of hops of 3. In FIG. 16, only the nodes on the route to nodes N9 and N10 with the maximum hop count are shown because of space limitation.

The verification requesting NE sends a second request packet to verify topology to the node N9 (with the maximum hop count) to be checked. In this second request packet, the MAC address of the node N9 to be checked is set in the destination address (DA) field, the MAC address of the verification requesting NE is set in the source address (SA) field, both TTL that is decremented each time the packet passes through a node and TTL base that is an initial value of TTL are set to 1. Subsequently, the verification requesting NE sends further second request packets to verify topology to the node N9 (with the maximum hop count) to be checked, while incrementing the TTL and TTL base by one up to the maximum hop count.

A node other than the verification requesting NE receives a second request packet to verify topology and decrements the TTL included in the packet. As a result, if the TTL becomes 0, the node generates a second reply packet in which the TTL base value is copied to the TTL field, the MAC address of the return destination is set in the destination address (DA) field, and the MAC address of the node is set in the source address (SA) field and returns this packet to the return destination (for example, the verification requesting NE). In view hereof, returning to FIG. 15, if the decision step 404 determines that TTL=0 is true, it is determined whether the received packet is a second request packet in step 406. Unless it is a second request packet, the received packet is discarded in step 106 and the packet receive processing terminates.

If the step 406 determinates that the received packet is a second request packet to verify topology, the process goes to step 408 where the node returns the above second reply packet to the return destination and terminates the packet receive processing in FIG. 15.

In this way, the verification requesting NE can receive second reply packets from the nodes on the route up to the node N9 with the maximum hops. Thus, in step 508 in FIG. 17, the NE gets to know the states of interconnections of nodes N5 and N8 before the node N9 with the maximum hops. In a decision step 510, it is determined whether another node with the same value of hop count variable H still remains in the list of nodes per hop count 49. If so, the process returns to step 504; if not, it is determined in a decision step 512 whether the hop count variable H is set to 1.

If the hop count variable H is more than 1 in step 512, the process goes to step 514 where it is determined whether an unknown node remains in the list of nodes per hop count 49.

If an unknown node remains, the process goes to step 516 where the hop count variable H is decremented and returns to step 504.

If the step 512 determines that hop count variable H=1 is true or the step 514 determines that no node that is unknown remains, the process of determining virtual LAN topology in FIG. 17 terminates.

According to the second embodiment of the present invention, the first and second check packets are sent and received, but each packet contains a small quantity of information as illustrated in FIGS. 14 and 16 and the process of verifying virtual LAN configuration is performed in a temporally distributed manner. Consequently, it can be avoided that the verification requesting NE is temporarily placed in an overload condition.

While the TTL sweep check is performed while incrementing the TTL value from 1 in the above example, it may also preferable to perform the TTL sweep check while decrementing the TTL from the maximum number of hops to 1.

The above-described embodiments of the present invention are provided for illustrative purposes only. Therefore, it would be easy for those skilled in the art to change or modify the above embodiments or make some addition thereto in line with the technical concept and principle of the present invention.

For example, the first embodiment is implemented by using hop count; however, instead, it is also possible to implement it by suing TTL. Conversely, the second embodiment is implemented by using TTL; however, instead, it is also possible to implement it by using hop count.

While the present invention essentially aims to analyze virtual LAN formation on the assumption that the addresses of nodes constituting the virtual LAN are unknown, the invention can also be used for nodes whose addresses are known to carry out route finding and RTT measurement To carry out RTT measurement, both receiving and sending nodes store time stamps each time sending and receiving are performed. By adding the time stamps such as time at which a packet is sent from the sending node, time at which the packet is received at the receiving node, time at which a reply is sent from the receiving node, and time at which the reply is received at the sending node to reply packets, accurate RTT measurement can be performed.

While, in the above-described embodiments, detecting one VLAN configuration set up on one network is discussed, it will be apparent to those skilled in the art that the present invention can be applied to an upper LAN consisting of a plurality of VLANs (tentatively referred to as a virtual wide are network (VWAN)) by using an encapsulation technique.

According to the present invention, even if nodes constituting a virtual LAN in an Ethernet network are unidentifiable, it is possible to keep track of the actual states of interconnections of the constituent nodes.

What is claimed is:

1. A method comprising:
    selecting an arbitrary node device belonging to a first virtual local area network to be detected from a certain network in which the first virtual local area network and a second virtual local area network are set up;
    sending a request packet from the arbitrary node device to each of its adjacent node devices that belong to the first virtual local area network, the request packet including a first count value indicating the number of communication hops across node devices, a media access control address of the arbitrary node device and a virtual local area network tag that identifies the first virtual local area network to be detected;
    sending from each of said adjacent node devices, upon receiving said request packet, said request packet in which said first count value is incremented or decremented to each of its adjacent node devices that belong to the first virtual local area network, excluding a sender of said request packet received, and a reply packet including said sender's media access control address, a media access control address of the node device that is a replying node device, the virtual local area network tag and a second count value copied from said first count value of said request packet received by said replying node device to a given return destination;
    collecting the reply packets including second count value entries, sender address entries and replying node address entries from said reply packets;
    creating a table of records including said second count value entries, said sender address entries, and said replying node address entries of each of collected packets;
    sorting the records in said table in ascending order of said second count value entries as a first key and further sorting the records in ascending order of said sender address entries as a second key;

linking said sender node device and said replying node device in each record and plotting sender node devices with the same sender address as a convergence point; and determining topology of the first virtual local area network by analyzing the records in said table in order.

2. The method for detecting virtual local area network topology according to claim 1, wherein said second count value is either Time To Live or hop count from the arbitrary node device.

3. The method for detecting virtual local area network topology according to claim 1, wherein:

said request packet includes said sender address and the number of a sending port through which the request packet is sent;

said reply packet includes said sending port number as well as said sender address and the number of a receiving port through which said request packet was received as well as said replying node address; and said analyzing includes collecting reply packets including second value entries, sender address entries, replying node address entries and receiving port entries, and creating a table of records including said second count value entries, said sender address entries, said sending port number entries, said replying node address entries, and said receiving port number entries from said collected packets.

4. The method for detecting virtual local area network topology according to claim 1, wherein:

said request packet includes a time at which said request packet is sent in said request packet;

the reply packet includes a time at which said request packet is received and time at which said reply packet is sent in said reply packet; and said analyzing includes recording time at which said reply packet is received and obtaining round trip time from the time at which said request packet is sent, the time at which said request packet is received, the time at which said reply packet is sent, and the time at which said reply packet is received.

5. A method comprising:

selecting an arbitrary node device belonging to a first virtual local area network to be detected from a certain network in which the first virtual local area network and a second virtual local area network are set up;

sending a first request packet from the arbitrary node device, the first request packet including a count value indicating the number of communication hops across node devices, an initial value of said count value, media access control address of the arbitrary node device and a virtual local area network tag that identifies the first virtual local area network to be detected, to each of its adjacent node devices that belong to the first virtual local area network;

modifying, within a node device receiving the first request packet, the received first request packet to include a media access control address of said node device as a source address;

sending the modified packet as a first reply packet to a given return destination;

incrementing or decrementing, within the node device receiving the first request packet, said count value included in the first request packet;

sending, by the node device receiving the first request packet, the first request packet including the incremented or decremented count value to each of its adjacent node devices that belong to the first virtual local area network and are adjacent to the node device, excluding a sender of said first request packet received;

collecting, at said given return destination, said reply packets to make a list of node devices per hop count, based on said count values and said initial values included in said reply packets;

sending, repeatedly, to a node device to be checked a second request packet, the second request packet including a count value that is incremented each time the second request packet is sent and an initial value of the count value, the sending of the second request packet is repeated until all positive integers up to said hop count of said node device to be checked are used as said initial value;

decrementing, within the node device receiving the second request packet, said count value included in the second request packet;

modifying, within the node device receiving the second request packet, the second request packet to include the media access control address of the node device receiving the second request packet;

sending the modified second request packet as a reply packet to the given return destination when said count value included in the second request packet becomes 0 wherein said count value of the reply packet is set to the initial value of the second request packet; and assigning, at said given return destination, a node device for said node device to be checked from the node devices list in descending order in the hop counts until interconnections of all node devices in said node devices list are ascertained to detect topology of nodes constituting the first virtual local area network.

6. The method for detecting virtual local area network topology according to claim 5, wherein said given return destination is the arbitrary node device.

7. The method for detecting virtual local area network topology according to claim 5, wherein said count value is Time To Live.

8. The method for detecting virtual local area network topology according to claim 5, wherein said virtual local area network includes a plurality of lower virtual local area networks.

9. A node apparatus within a certain network comprising:

receiving means for receiving a request packet including a first count value indicating the number of communication hops across nodes, hop-by-hop sent in a multicast domain of a first virtual local area network from an arbitrary node that indisputably belongs to the first virtual local area network to be detected, when the arbitrary node device is selected from the certain network in which the first virtual local area network and a second virtual local area network are set up; and sending means for sending from each of said nodes, upon receiving said request packet, said request packet in which said first count value is incremented or decremented to each of its adjacent nodes that belong to the first virtual local area network identified by the virtual local area network tag, excluding a sender of said request packet received, and a reply packet to said arbitrary node includes a virtual local area network tag that identifies the first virtual local area network to be detected, collecting means for collecting the reply packets including second count value entries, sender address entries and replying node address entries from said reply packets;

creating means for creating a table of records including said second count value entries, said sender address entries, and said replying node address entries of each of collected packets;

sorting means for sorting the records in said table in ascending order of said second count value entries as a first key and further sorting the records in ascending order of said sender address entries as a second key;

linking means for linking said sender node device and said replying node device in each record and plotting sender node devices with the same sender address as a convergence point; and determining means for determining topology of the first virtual local area network by analyzing the records in said table in order.

10. A non-transitory recording medium having a computer-executable program recorded thereon, said program causing a processor to perform:

selecting an arbitrary node device belonging to a first virtual local area network to be detected from a certain network in which the first virtual local area network and a second virtual local area network are set up;

sending a request packet from the arbitrary node to each of its adjacent nodes that belong to the first virtual local area network, the request packet including a first count value indicating the number of communication hops across nodes, media access control address of the arbitrary node and a virtual local area network tag that identifies the first virtual local area network to be detected;

sending from each of said adjacent nodes, upon receiving said request packet, said request packet in which said first count value is incremented or decremented to each of its adjacent nodes that belong to the first virtual local area network and are adjacent to the node, excluding a sender of said request packet received, and a reply packet including said sender's media access control address, a media access control address of the node that is a replying node, and a second count value copied from said first count value of said request packet received by said replying node to a given return destination;

collecting the reply packets including second count value entries, sender address entries and replying node address entries from said reply packets;

creating a table of records including said second count value entries, said sender address entries, and said replying node address entries of each of collected packets;

sorting the records in said table in ascending order of said second count value entries as a first key and further sorting the records in ascending order of said sender address entries as a second key;

linking said sender node device and said replying node device in each record and plotting sender node devices with the same sender address as a convergence point; and determining topology of the first virtual local area network by analyzing the records in said table in order.

11. A non-transitory recording medium having a computer-executable program recorded thereon, said program comprising:

selecting an arbitrary node device belonging to a first virtual local area network to be detected from a certain network in which the first virtual local area network and a second virtual local area network are set up;

sending a first request packet from the arbitrary node to each of its adjacent nodes that belong to the first virtual local area network, the first request packet including a count value indicating the number of communication hops across nodes and an initial value of said count, media access control address of the arbitrary node and a virtual local area network tag that identifies the first virtual local area network to be detected;

modifying, within a node receiving the first request packet, the received first request packet to include a media access control address of said node as a source address;

sending the modified packet as a first reply packet to a given return destination;

incrementing or decrementing, within the node receiving the first request packet, said count value included in the first request packet;

sending, by the node receiving the first request packet, the first request packet including the incremented or decremented count value to each of its adjacent nodes that belong to the first virtual local area network and are adjacent to the node, excluding a sender of said first request packet received;

collecting, at said given return destination, said reply packets to make a list of nodes per hop count, based on said count values and said initial values included in said reply packets;

sending, repeatedly, to a node to be checked a second request packet, the second request packet including a count value that is incremented each time the second request packet is sent and an initial value of the count value, the sending of the second request packet is repeated until all positive integer up to said hop count of said node to be checked is used as said initial value;

decrementing, within the node receiving the second request packet, said count value included in the second request packet;

modifying, within the node receiving the second request packet, the second request packet to include the media access control address of the node receiving the second request packet;

sending the modified second request packet as a reply packet to the given return destination when said count value included in the second request packet becomes 0 wherein said count value of the reply packet is set to the initial value of the second request packet;

a step in which, upon receiving said second request packet, each of said nodes increments or decrements said count value as predetermined;

a step in which, each of said nodes sets said initial value for said count value in said second request packet, sets its node address for a source address of said second request packet received, and sends the packet as a second reply packet to the given return destination when said count value becomes 0; and assigning, at said given return destination, a node for said node to be checked from the nodes list in descending order in the hop counts and until interconnections of all nodes in said nodes list are ascertained.

* * * * *